(12) United States Patent

Holmberg et al.

(10) Patent No.: US 12,645,046 B2

(45) Date of Patent: Jun. 2, 2026

(54) COMMUNICATIONS PANEL SYSTEMS

(71) Applicant: CommScope Technologies LLC, Hickory, NC (US)

(72) Inventors: Matthew J. Holmberg, Le Center, MN (US); Ryan D. Willis, Minneapolis, MN (US); James J. Solheid, Minneapolis, MN (US); Rodney C. Schoenfelder, Shakopee, MN (US); David Jan Irma Van Baelen, Winksele (BE)

(73) Assignee: CommScope Technologies LLC, Claremont, NC (US)

( * ) Notice: Subject to any disclaimer, the term of this patent is extended or adjusted under 35 U.S.C. 154(b) by 244 days.

(21) Appl. No.: 18/552,647

(22) PCT Filed: Mar. 25, 2022

(86) PCT No.: PCT/US2022/021967

§ 371 (c)(1),
(2) Date: Sep. 26, 2023

(87) PCT Pub. No.: WO2022/204527

PCT Pub. Date: Sep. 29, 2022

(65) Prior Publication Data

US 2024/0159983 A1     May 16, 2024

Related U.S. Application Data

(60) Provisional application No. 63/197,018, filed on Jun. 4, 2021, provisional application No. 63/166,576, filed on Mar. 26, 2021.

(51) Int. Cl.
*G02B 6/44* (2006.01)

(52) U.S. Cl.
CPC ................................. *G02B 6/44526* (2023.05)

(58) Field of Classification Search
CPC .......................... G02B 6/44526; G02B 6/4453; G02B 6/4455; E05D 11/10; E05D 11/1007
See application file for complete search history.

(56) References Cited

U.S. PATENT DOCUMENTS

| | | |
|---|---|---|
| 5,210,906 A | 5/1993 | Aihara et al. |
| 6,079,173 A | 6/2000 | Waalkes et al. |

(Continued)

FOREIGN PATENT DOCUMENTS

| | | |
|---|---|---|
| DE | 10 2017 122 190 A1 | 3/2019 |
| EP | 0 918 451 A2 | 5/1999 |

(Continued)

OTHER PUBLICATIONS

Partial Supplementary European Search Report for Application No. 22776735.7 mailed Feb. 3, 2025.

(Continued)

*Primary Examiner* — Eric Wong

(74) *Attorney, Agent, or Firm* — MERCHANT & GOULD P.C.

(57) ABSTRACT

A panel system includes a front door attached to a chassis by a living hinge. In certain examples, the door also is pivotally attached to the living hinge. The living hinge components can snap-fit to the front door and/or to the chassis. The panel system also may have a mounting bracket that attaches to the chassis without tools to hold the chassis at a rack. The mounting bracket may be mounted at any of multiple predetermined positions along the depth of the chassis.

20 Claims, 36 Drawing Sheets

(56) References Cited

U.S. PATENT DOCUMENTS

| | | | |
|---|---|---|---|
| 6,106,055 | A * | 8/2000 | Fischer .................. B60N 3/026 |
| | | | 296/214 |
| 6,405,984 | B1 | 6/2002 | Simons et al. |
| 6,615,992 | B1 | 9/2003 | Lauchner et al. |
| 6,622,873 | B2 | 9/2003 | Hegrenes et al. |
| 6,840,388 | B2 | 1/2005 | Mayer |
| D600,542 | S * | 9/2009 | Zemel ........................... D8/395 |
| 7,762,411 | B2 | 7/2010 | Hilburn et al. |
| 8,025,166 | B2 | 9/2011 | Hilburn et al. |
| 8,242,364 | B1 | 8/2012 | Shotey et al. |
| 8,457,464 | B2 | 6/2013 | O'Connor |
| 8,562,086 | B1 | 10/2013 | Baik et al. |
| 8,672,428 | B2 | 3/2014 | Takeuchi et al. |
| 8,839,561 | B2 | 9/2014 | Yagi et al. |
| 8,925,469 | B2 | 1/2015 | Bennie et al. |
| 9,002,167 | B2 | 4/2015 | Rathod et al. |
| 9,134,497 | B2 | 9/2015 | Guzzo et al. |
| 9,910,455 | B1 | 3/2018 | Morrison et al. |
| 11,582,538 | B2 | 2/2023 | O'Young et al. |
| 11,740,421 | B2 | 8/2023 | Van Baelen et al. |
| 12,114,111 | B2 * | 10/2024 | Verza ...................... H04Q 1/13 |
| 2006/0234782 | A1 | 10/2006 | Dorenkamp et al. |
| 2010/0109493 | A1 | 5/2010 | Fargeau et al. |
| 2010/0220967 | A1 | 9/2010 | Cooke et al. |
| 2010/0296791 | A1 | 11/2010 | Makrides-Saravanos et al. |
| 2012/0084949 | A1 * | 4/2012 | Al-Basri .............. A47G 21/167 |
| | | | 24/457 |
| 2013/0016461 | A1 | 1/2013 | Fan et al. |
| 2014/0312753 | A1 * | 10/2014 | Courchaine ........ G02B 6/44528 |
| | | | 312/258 |
| 2016/0085041 | A1 | 3/2016 | Malolepszy et al. |
| 2018/0245383 | A1 | 8/2018 | Jeffries |
| 2019/0128033 | A1 * | 5/2019 | Wells ...................... E05D 11/10 |
| 2019/0302385 | A1 | 10/2019 | Wiltjer et al. |
| 2019/0320542 | A1 | 10/2019 | De Vis et al. |
| 2021/0231882 | A1 | 7/2021 | Haase |
| 2022/0030736 | A1 * | 1/2022 | Zhelyazkov .............. H01H 1/18 |

FOREIGN PATENT DOCUMENTS

| | | |
|---|---|---|
| WO | 2014/124001 A2 | 8/2014 |
| WO | 2022/204515 A1 | 9/2022 |

OTHER PUBLICATIONS

Extended European Search Report for Application No. 22776735.7 mailed May 30, 2025.

International Search Report and Written Opinion for Application No. PCT/US2022/021967 mailed Jul. 11, 2022.

* cited by examiner

COMMUNICATIONS PANEL SYSTEMS

CROSS-REFERENCE

This application is a National Stage Application of PCT/US2022/021967, filed on Mar. 25, 2022, which claims the benefit of U.S. Patent Application Ser. No. 63/166,576, filed on Mar. 26, 2021 and claims the benefit of U.S. Patent Application Ser. No. 63/197,018, filed on Jun. 4, 2021, the disclosures of which are incorporated herein by reference in their entireties. To the extent appropriate, a claim of priority is made to each of the above disclosed applications.

BACKGROUND

In the telecommunications industry, the demand for added capacity is growing rapidly. This demand is being met in part by the increasing use and density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

In communications panel systems, port members (e.g., optical adapters, electrical jacks, hybrid port members, etc.) defining front ports are mounted to one or more trays that are disposable within a chassis. The front ports are configured to receive plug connectors at the fronts of the trays. The trays can either be stationary within a chassis or can slide forwardly of the chassis to enhance access to the port members. Improvements are desired.

SUMMARY

Some aspects of the disclosure are directed to a hinge arrangement by which the front door of a chassis may selectively block and allow access to an interior of the chassis. The hinge arrangement includes a living hinge.

In certain implementations, the hinge arrangement includes a hinge part, a first retainer part, and a second retainer part. The hinge part mounts to the chassis towards the bottom of the chassis, the second retainer part mounts to the chassis towards the top of the chassis: and the first retainer part mounts to the door.

In some examples, the hinge part also mounts to the door. In such implementations, the door moves relative to the chassis along a flex axis of the hinge part. In other examples, the hinge part also mounts to the first retainer part. In some certain implementations, the hinge part rotatably mounts to the first retainer part. In such implementations, the door moves relative to the chassis along a flex axis of the hinge part and along a rotation or pivot axis between the hinge part and the first retainer part.

In some implementations, the living hinge of the hinge part has a range of motion of about 90 degrees in opposite directions from a neutral position. In other implementations, the living hinge has a range of motion of about 90 degrees in one direction from a neutral position and no more than 45 degrees in an opposite direction from the neutral position.

In certain implementations, the components of the hinge arrangement snap-fit to the chassis and door.

Other aspects of the disclosure are directed to a mounting bracket arrangement suitable for toollessly attaching mounting brackets to opposite sides of the chassis.

In certain implementations, the mounting bracket arrangement includes a plurality of guide pegs extending outwardly from the chassis and a fixation member defining open-ended notches. A mounting bracket defines a plurality of holes through which the guide pegs extend when the mounting bracket is disposed at one of the sides of the chassis. The fixation member can be slid over the guide pegs to sandwich the mounting bracket between the fixation member and the chassis.

In certain implementations, the chassis includes more guide pegs arranged along the depth of the chassis than the mounting bracket has holes. In such implementations, the mounting bracket can be arranged at any of a plurality of positions along the depth of the chassis.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
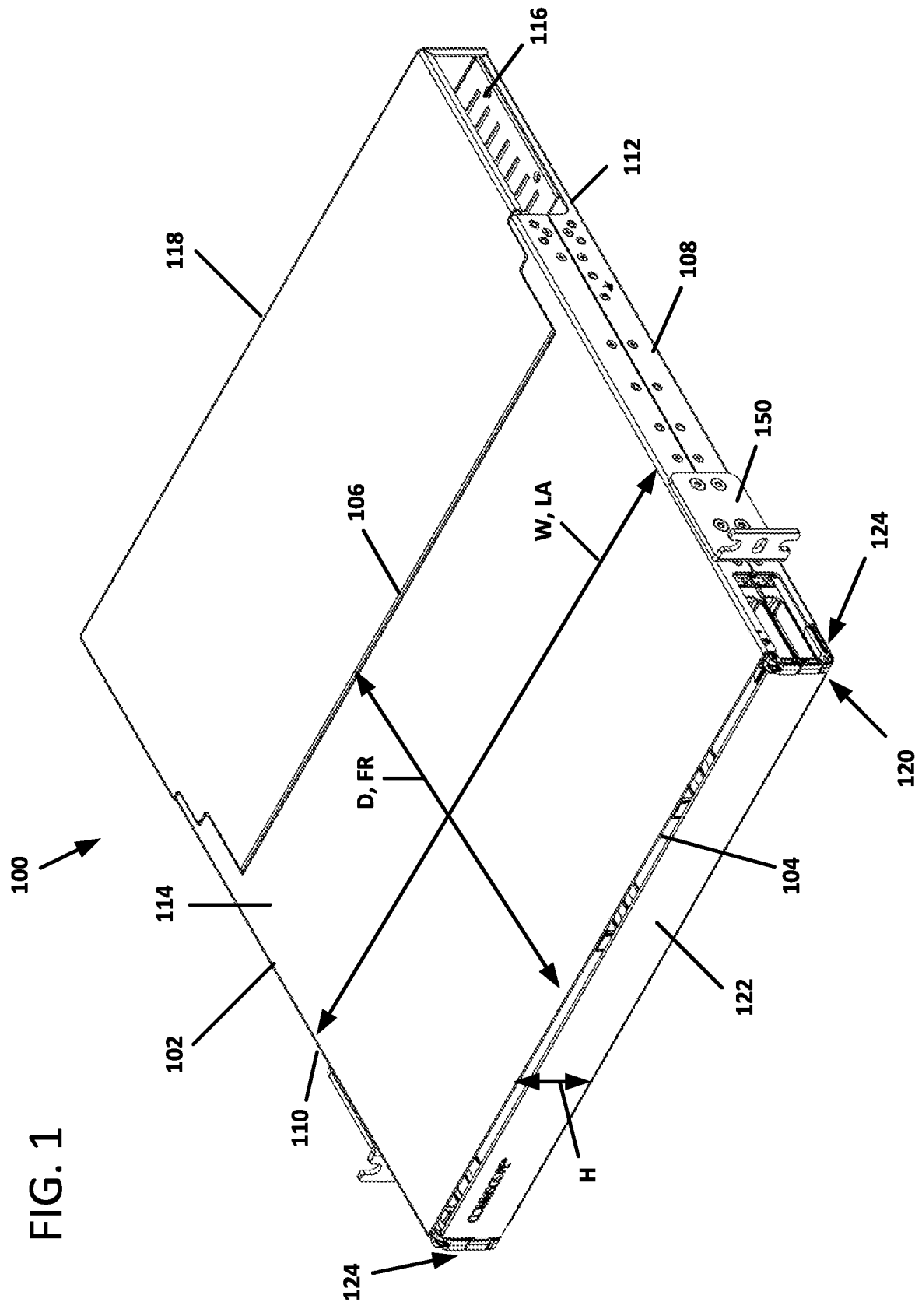
FIG. 1 is a perspective view of an example communications panel including a chassis configured to hold one or more tray arrangements and configured in accordance with the principles of the present disclosure.

Reference will now be made in detail to exemplary aspects of the present disclosure that are illustrated in the accompanying drawings. Wherever possible, the same reference numbers will be used throughout the drawings to refer to the same or like parts.

The present disclosure is directed to a communications panel 100 configured to mount to a rack. The communications panel 100 includes a chassis 102 holding one or more tray arrangements. Examples of various tray arrangements suitable for use in the chassis 102 are described in co-pending U.S. provisional application No. 63/150,828, filed Feb. 18, 2021, and titled "Communications Panel System," co-pending U.S. provisional application No. 63/166,558, filed Mar. 26, 2021, and titled "Communications Panel System," and co-pending U.S. provisional application No. 63/166,636, filed Mar. 26, 2021, and titled "Communications Panel Systems and Trays Therefore," the disclosures of which are hereby incorporated by reference in their entirety.

The chassis 102 has a depth D extending along a forward-rearward axis FR between a front 104 and a rear 106. The chassis 102 also has a width W extending along a lateral axis LA between opposite first and second sides 108, 110. The chassis 102 also has a height H extending between a bottom wall 112 and a top wall 114. In certain implementations, a cable management section 116 is disposed at the rear 106 of the chassis 102 to manage cables extending to the chassis 102 from the rear. A removable cover 118 is mounted over the cable management section 116. In certain examples, the removable cover 118 is flush with the top panel 114 of the chassis 102. In certain examples, sides of the cable management section 116 remain uncovered to facilitate cable routing to/from the cable management section 116.

In accordance with some aspects of the disclosure, a front door arrangement 120 is mounted at the front 104 of the chassis 102 is selectively block and allow access to an interior of the chassis 102 through the front 104. The front door arrangement 120 includes a door 122 that extends along at least a majority of the width W and at least a majority of the height H of the chassis 102 when disposed in the blocking position. The door 122 moving away from the front 104 of the chassis 102 when moved to the access position. In some examples, the door 122 does not cover any portion of the front 104 when disposed in the access position. In other examples, the door 122 extends over only a lower strip of the front 104 when disposed in the access position.

In certain implementations, mounting brackets 150 are disposed at the first and second sides 108, 110 of the chassis 102. The mounting brackets 150 are configured to mount the chassis 102 to the rack. In certain implementations, a first mounting bracket 150 mounts to the first side 108 of the chassis 102 and a second mounting bracket 150 mounts to the second side 110. In accordance with certain aspects of the disclosure, the mounting brackets 150 may be toollessly mounted to the chassis 102 (e.g., mounted without fasteners or other parts requiring separate tools). Such mounting brackets 150 will be discussed in more detail herein with reference to FIGS. 35-40. In other implementations, the mounting brackets 150 may be mounted to the chassis 102 via fasteners.

Figure 2:
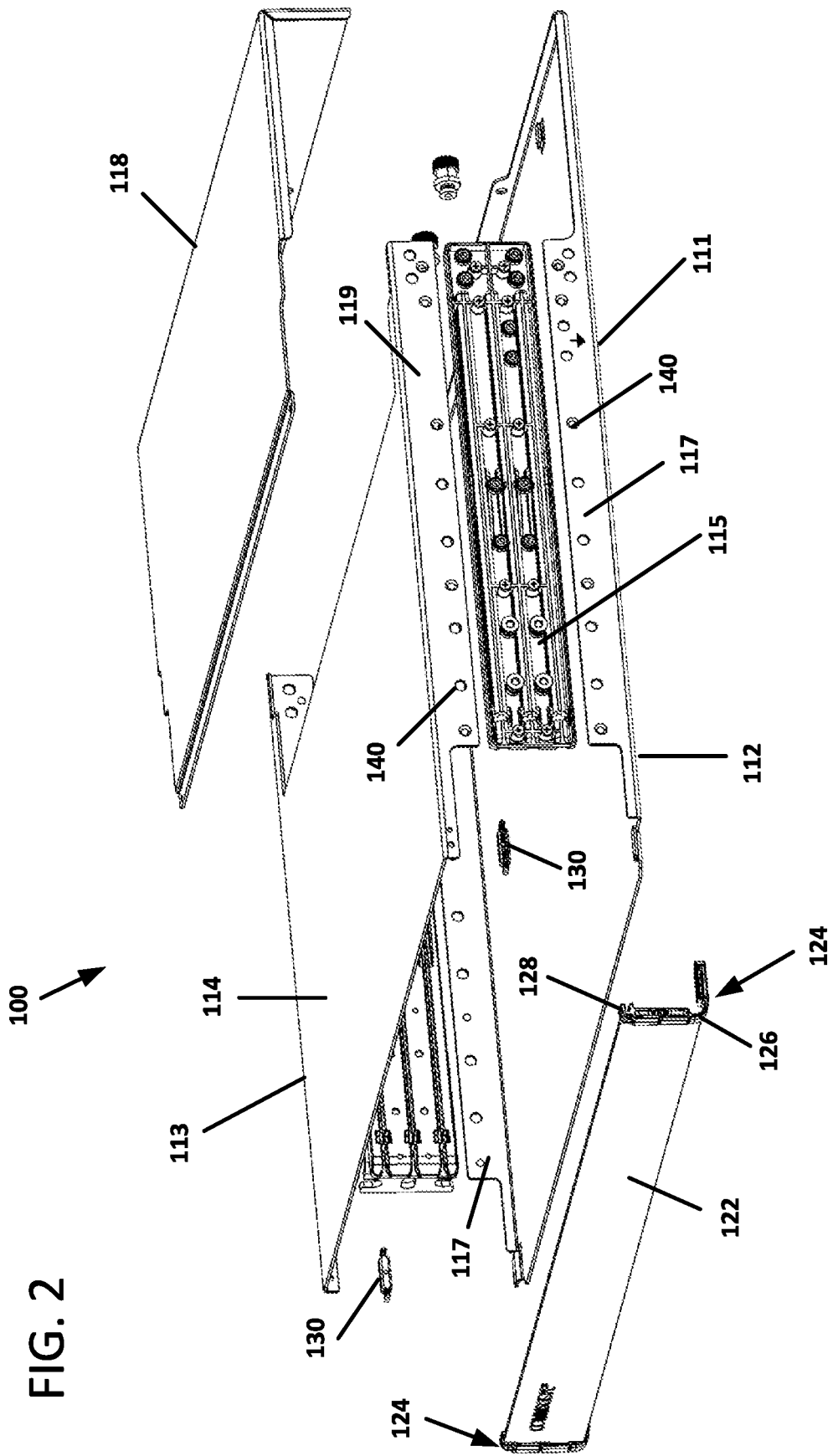
FIG. 2 shows the components of the chassis of FIG. 1 exploded away from each other for ease in viewing.

Referring to FIG. 2, the chassis 102 may be formed of a bottom piece 111, a top piece 113, and side pieces 115. In certain examples, the side pieces 115 defines tray guides at interior surfaces. The bottom piece 111 defines the bottom wall 112 and side flanges 117 extending upwardly from the bottom wall 112. The top piece 113 defines the top wall 114 and side flanges 119. Each of the side flanges 117, 119 defines apertures 140 that align with apertures in the side pieces 115 so that fasteners can be inserted therethrough to hold the bottom piece 111, the side pieces 115, and the top piece 113 together. In other implementations, the bottom piece 11, top piece 113, and side pieces 115 can be latched together.

Figure 3:
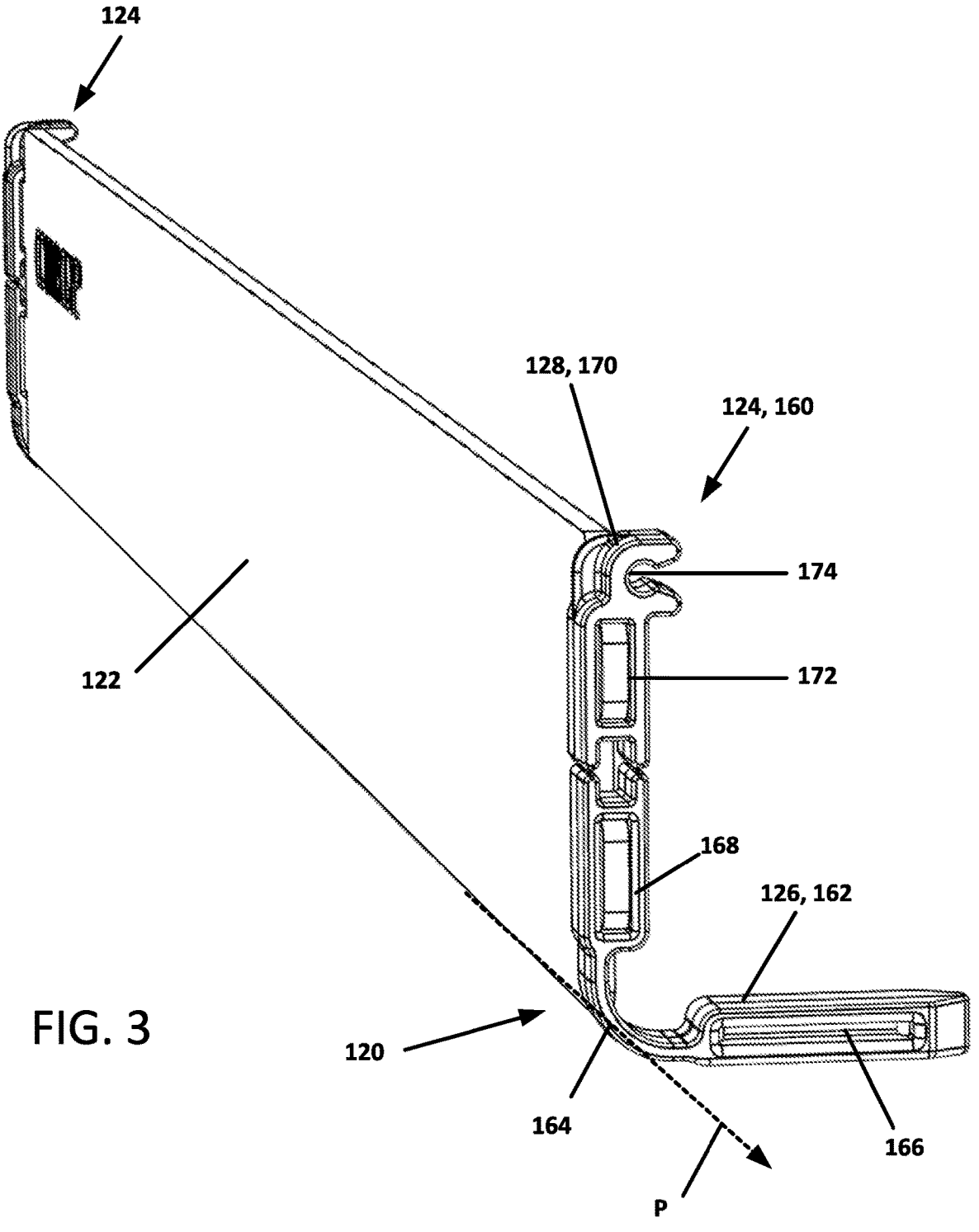
FIG. 3 is a perspective view of a first example hinge arrangement suitable for mounting the door to the chassis, the first hinge arrangement being shown in a first flexed position.
Figure 4:
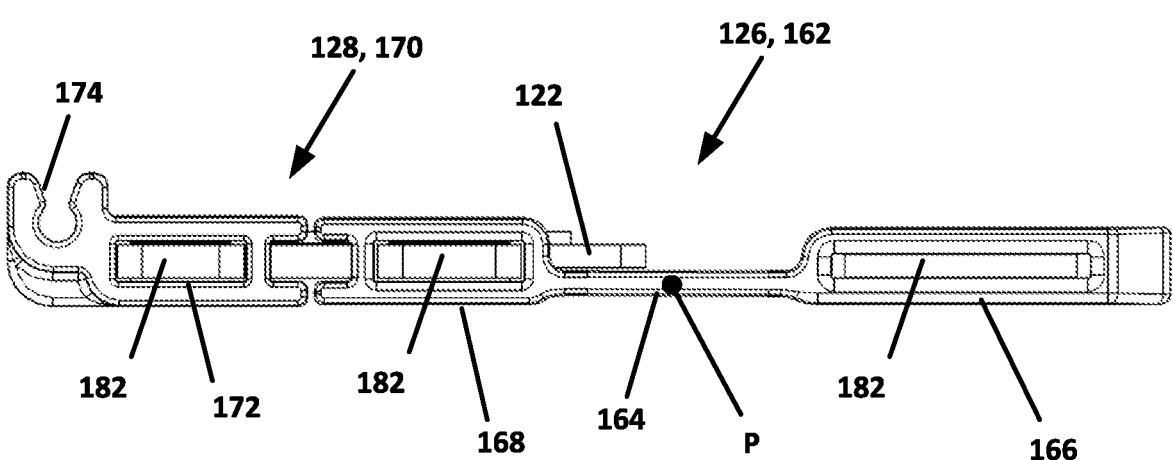
FIG. 4 shows the first hinge arrangement of FIG. 3 disposed in a neutral position.
Figure 5:
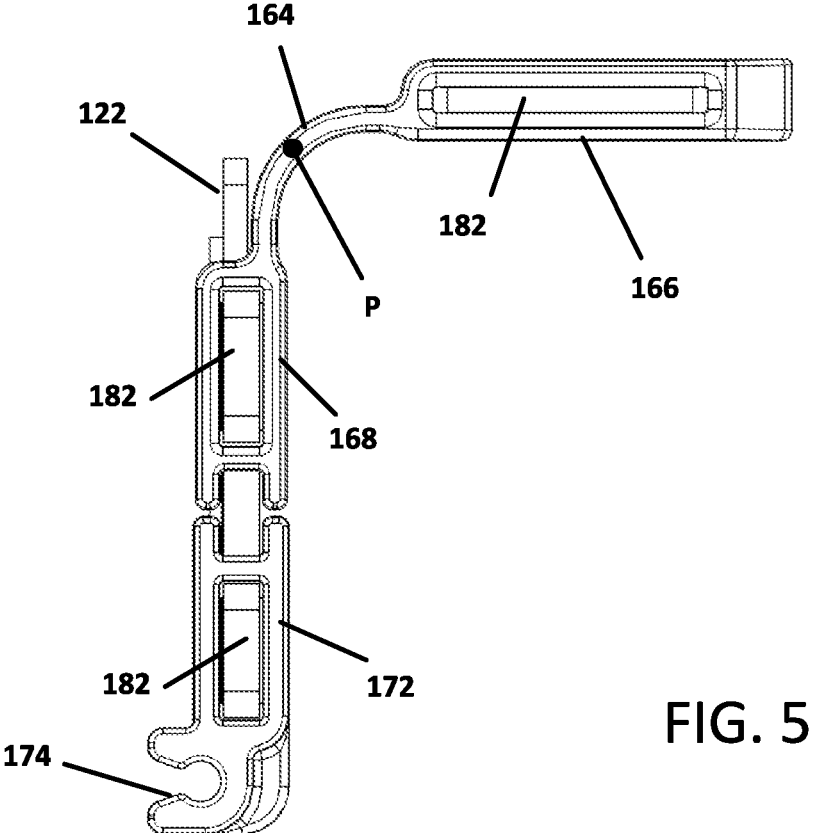
FIG. 5 shows the first hinge arrangement of FIG. 3 flexed into a second flexed position.
Figure 11:
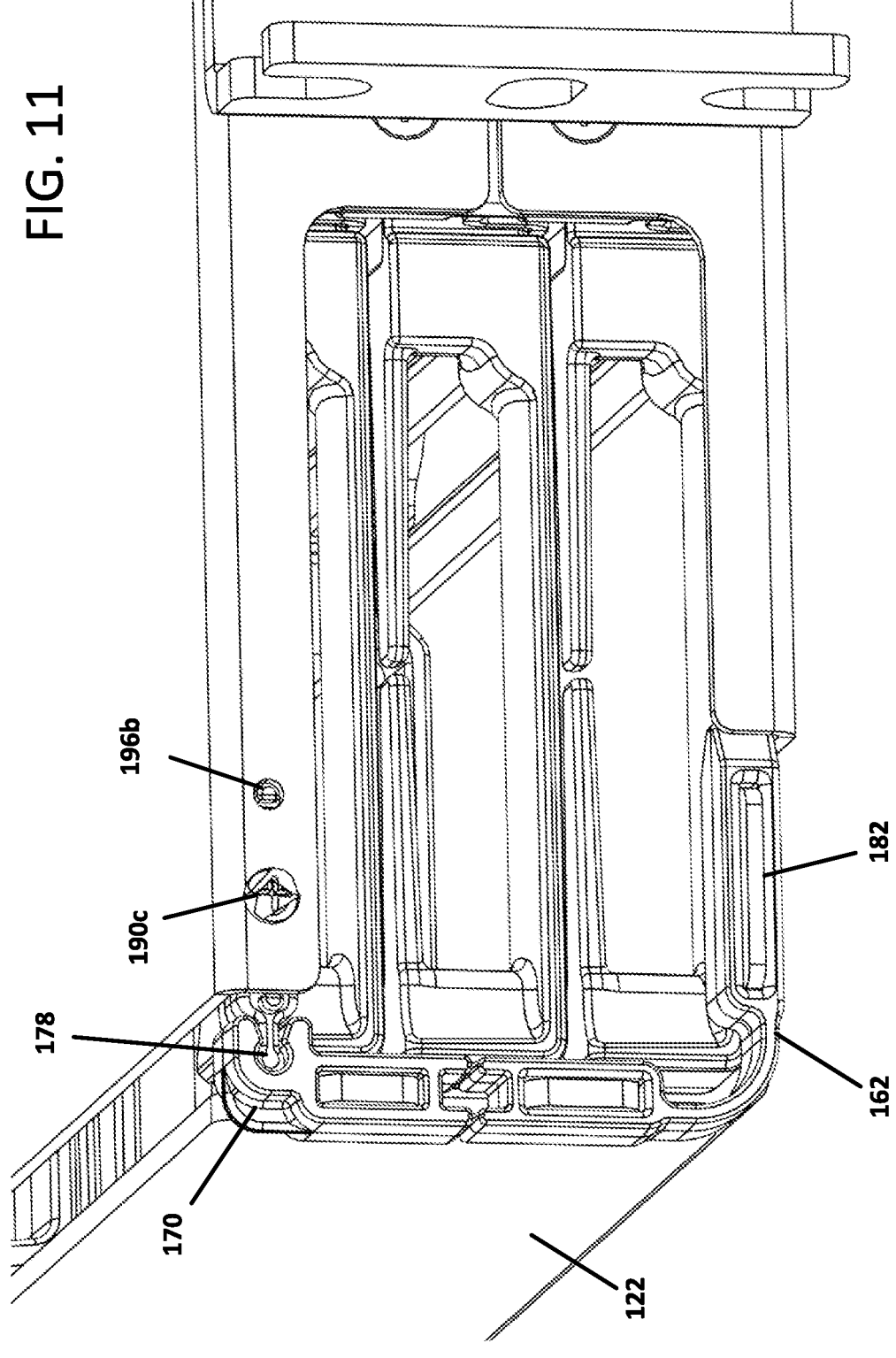
FIG. 11 shows the first hinge arrangement of FIG. 3 holding the door in a closed position to block the front of the chassis.

In certain implementations, the door 122 is mounted to the chassis 102 to flex about a flex axis P (e.g., see FIGS. 3-5) between the blocking and access positions. In certain examples, the door arrangement 120 includes a hinge arrangement 124 mounted to opposite sides of the door 122. Each hinge arrangement 124 mounts one side of the door 122 to the chassis 102 as will be discussed in more detail herein. The hinge arrangement 124 includes a hinge part 126, a first retainer part 128, and a second retainer part 130. The hinge part 126 enables the door 122 to pivot relative to the chassis 102. The first retainer part 128 is mounted to the door 122. The second retainer part 130 is fixedly mounted to the chassis 102 (e.g., at the top piece 113 of the chassis 102). The first retainer part 128 selectively engages the second retainer part 130 to releasably hold the door 122 in the blocking position (e.g., see FIG. 11) as will be discussed in more detail herein.

In some implementations, the hinge part 126 and the first retainer part 128 do not engage each other (e.g., are spaced from each other). In other implementations, the hinge part 126 and the first retainer part 128 engage each other (e.g., see FIGS. 19 and 20, which will be described below). In some implementations, the hinge part 126 is held at a stationary position relative to the first retainer part 128. For example, the hinge part 126 and the first retainer part 128 may be mounted to a common rigid structure such as the door 122 (e.g., sec FIG. 3). In other implementations, the first retainer part 128 is movable (e.g., rotatable, pivotable, etc.) relative to the hinge part 126 (e.g., see FIGS. 19 and 20).

In certain implementations, the hinge part 126 includes a living hinge 164, 248 (e.g., see FIGS. 3-5 and 21-25). In some implementations, the door 122 is configured to move relative to the chassis 102 only along a range of motion of the living hinge 164, 248. In other implementations, the door 122 is configured to move relative to the chassis 102 beyond the range of motion of the living hinge 164, 248. In some examples, the living hinge 164, 248 is configured to flex along at least 170 degrees of motion. In certain examples, the living hinge 164, 248 is configured to flex along at least 180, 248 degrees of motion. In other examples, the living hinge 164, 248 is configured to flex along no more than 130 degrees of motion. In certain examples, the living hinge 164, 248 is configured to flex along no more than 120 degrees of motion.

FIGS. 3-14 and FIGS. 41-43 illustrate a first example implementation 160 of a hinge arrangement 124. The hinge arrangement 160 includes a hinge part 162, a first retainer part 170, and a second retainer part 176. The hinge part 162 includes a living hinge 164 connecting a first mounting section 166 and a second mounting section 168. The first mounting section 166 is configured to mount to the chassis 102 (e.g., to the bottom piece 111) and the second mounting section 168 is configured to mount to the door 122. In certain examples, the hinge part 162 is monolithically formed as a single piece. In certain examples, the living hinge 164 is thinner than the first and second mounting sections 166, 168 to facilitate flexing of the living hinge 164.

In certain implementations, the living hinge 164 is configured to flex at least 90 degrees. Accordingly, the living hinge 164 enables the door 122 to pivot between the blocking position (e.g., see FIG. 11) and an access position (e.g., see FIGS. 4 and 5) in which the door 122 does not cover the front 104 of the chassis 102. In the example shown in FIG. 4, the door 122 is laid flat coplanar with the bottom wall 112 of the chassis 102. In certain examples, the living hinge 164 is configured to flex beyond 90 degrees. For example, the living hinge 164 may flex at least 110 degrees so that the door 122 drops below the bottom wall 112 of the chassis 102. Dropping the door 122 below the bottom wall 112 ensures that tray arrangements or other equipment being mounted within the chassis 102 can be inserted into the chassis 102 without interference. In certain examples, the living hinge 164 is configured to flex at least 135 degrees so that the door 122 is angled downwardly away from the chassis 102. In the example shown in FIG. 5, the living hinge 164 is configured to flex about 180 degrees.

Figure 6:
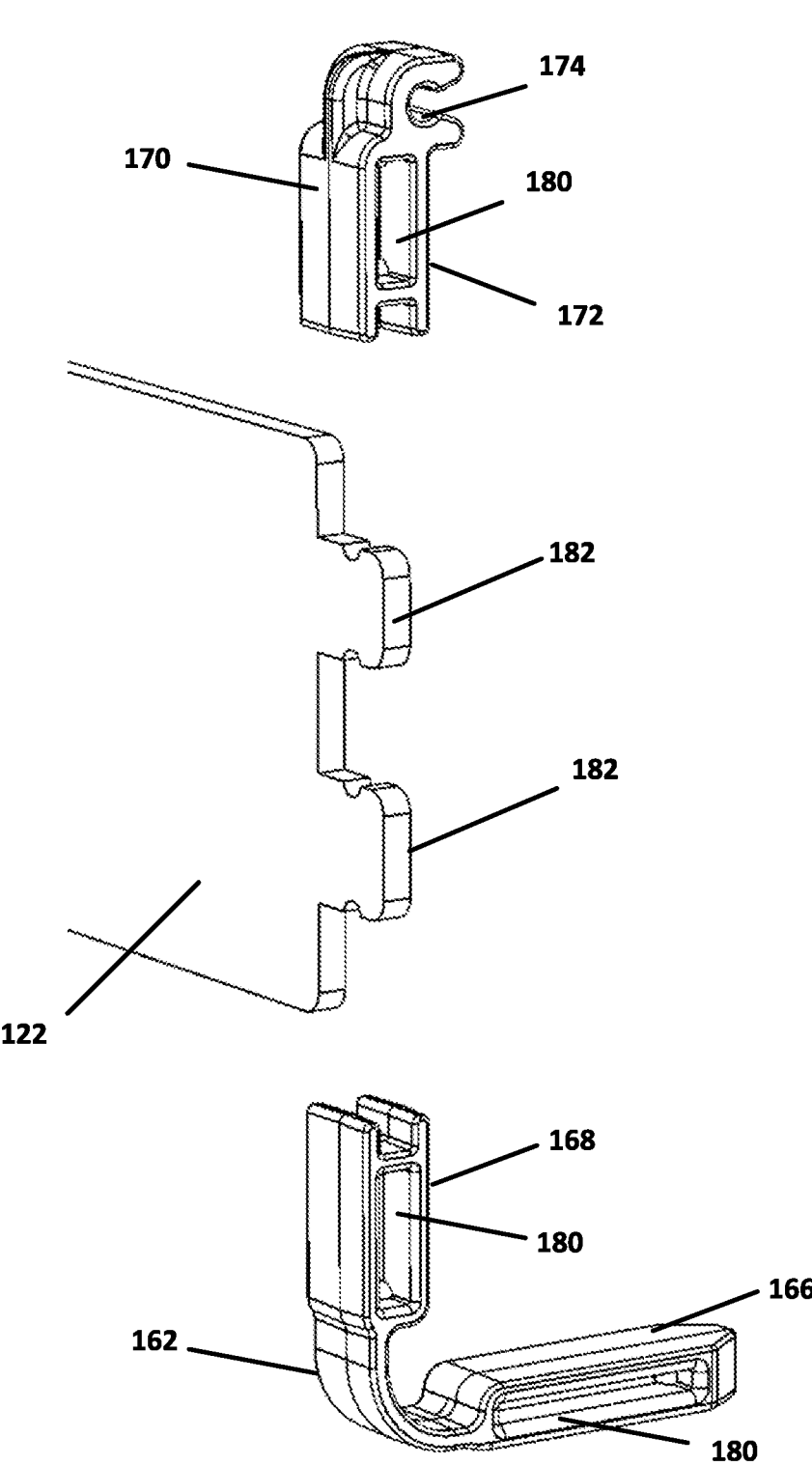
FIG. 6 shows the hinge part and the first retainer part of the first hinge arrangement exploded form the door.
Figure 44:
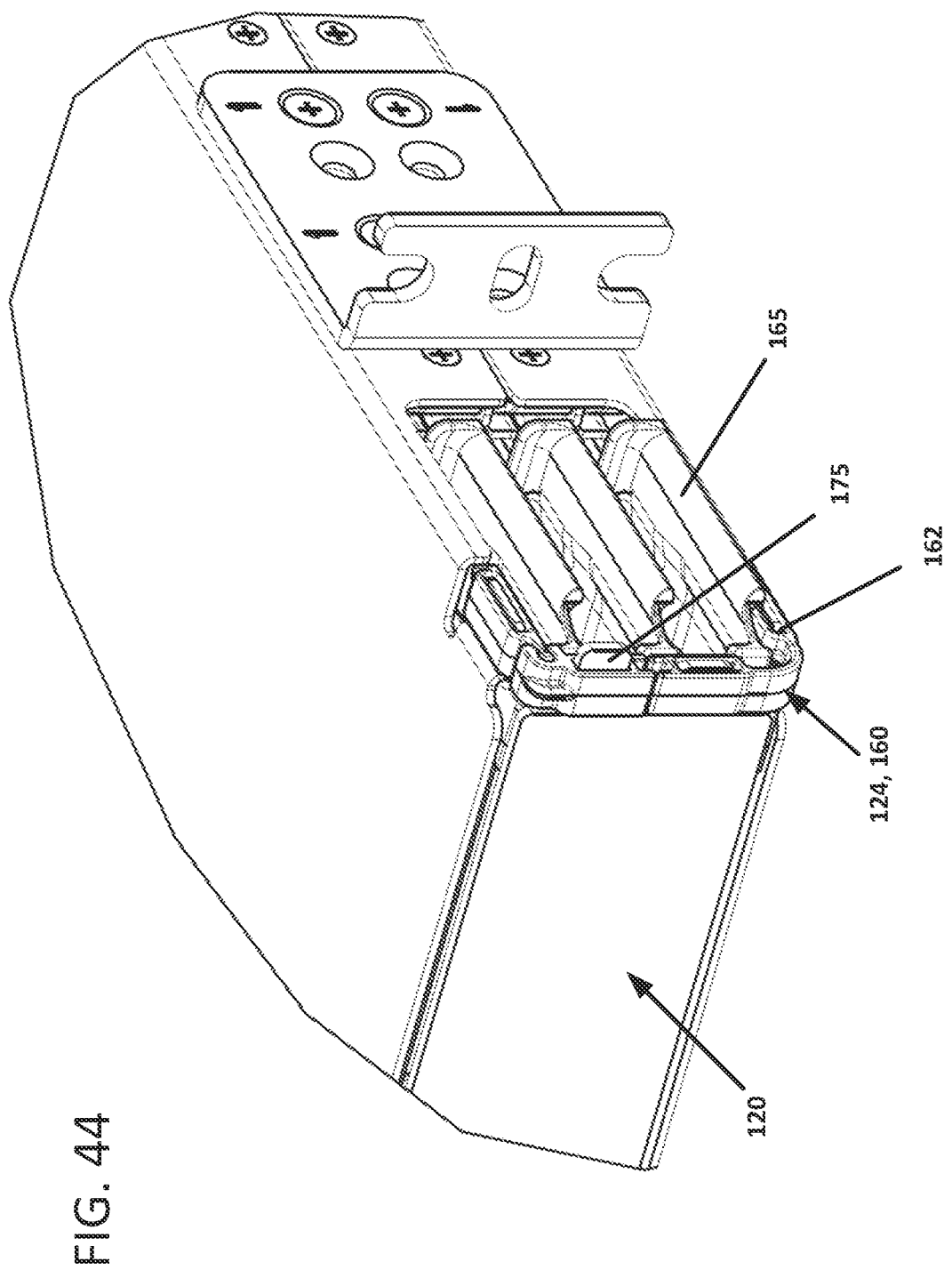
FIG. 44 is a perspective view of the hinge arrangement of FIG. 41 with a gripping tab shown extending outwardly to facilitate mechanical manipulation (e.g., opening) of the door.

As shown in FIG. 6, the first retainer part 170 includes a mounting section 172 and a retaining section 174. The mounting section 172 is configured to mount the first retainer part 170 to the door 122. The retaining section 174 is configured to releasably engage the second retainer part 176. In certain examples, the mounting section 172 may define a tab 175 extending laterally outwardly to provide a gripping surface for opening the door (see FIG. 44). Pulling the tab 175 with sufficient force when the door 122 is closed will open the door 122.

Figure 7:
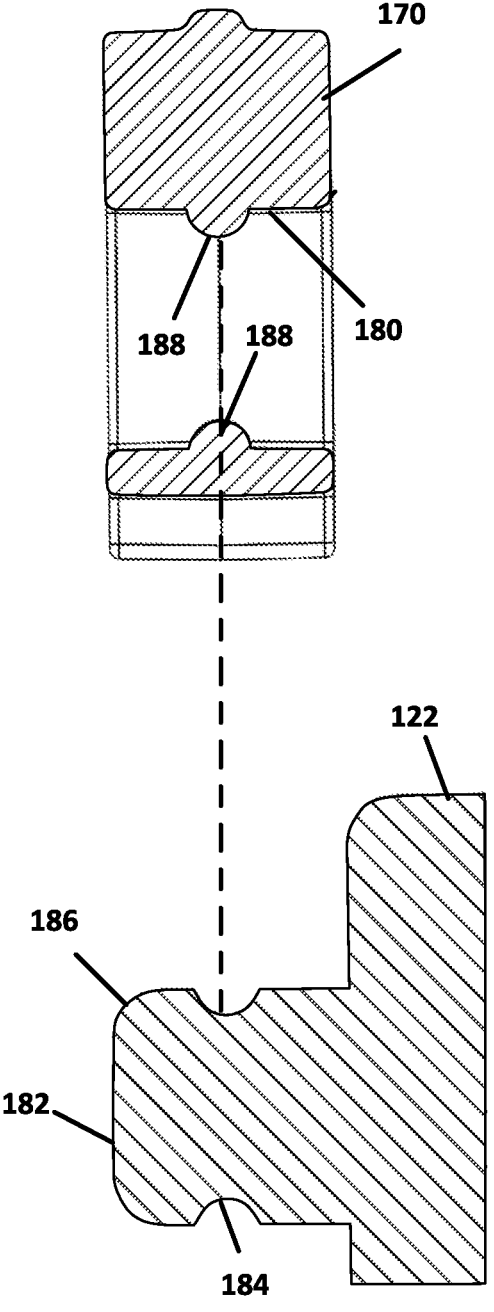
FIG. 7 is a cross-sectional view showing the first retainer part exploded from a tab of the door.
Figure 8:
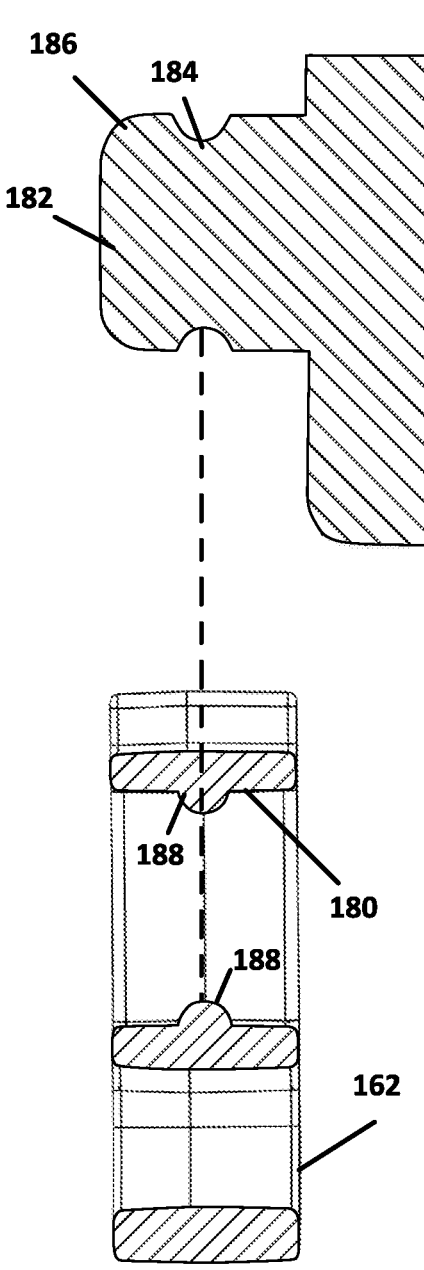
FIG. 8 is a cross-sectional view showing the hinge part exploded from a tab of the door.

The mounting section 172 defines an opening 180. The opening 180 is sized to receive a tab 182 of the door 122. As shown in FIG. 7, each tab 182 defines oppositely facing notches 184 positioned to be disposed within the opening 180 when the tab 182 is received in the mounting section 172. The mounting section 172 includes opposing protrusions 188 (e.g., bumps) sized and positioned to snap into the notches 184 when the tab 182 is disposed within the opening 180. Accordingly, the first retainer part 170 can be mounted to the door 122 by sliding the mounting section 172 over one of the door tabs 182. Engagement between the protrusions 188 and the notches 184 retain the tab 182 within the opening 180, In certain examples, each tab 182 defines a contoured or tapered leading surface 186 that facilitates insertion of the tab 182 into the opening 180.

As further shown in FIG. 6, the first mounting section 166 and second mounting section 168 of the hinge part 162 each define an opening 180 sized to receive a tab 182 (e.g., a tab 182 of the door 122 or a tab 182 of the chassis 102). Each tab 182 defines oppositely facing notches 184 positioned to be disposed within the opening 180 when the tab 182 is received in the respective mounting section 166, 168 (e.g., see FIG. 8). Each mounting section 166, 168 includes opposing protrusions 188 bumps) sized and positioned to snap into the notches 184 when the tab 182 is disposed within the opening 180. Accordingly, the hinge part 162 can be mounted to the door 122 by sliding the second mounting section 168 over one of the door tabs 182. Engagement between the protrusions 188 and the notches 184 retain the tab 182 within the opening 180. In certain examples, each tab 182 defines a contoured or tapered leading surface 186 that facilitates insertion of the tab 182 into the opening 180.

Figure 9:
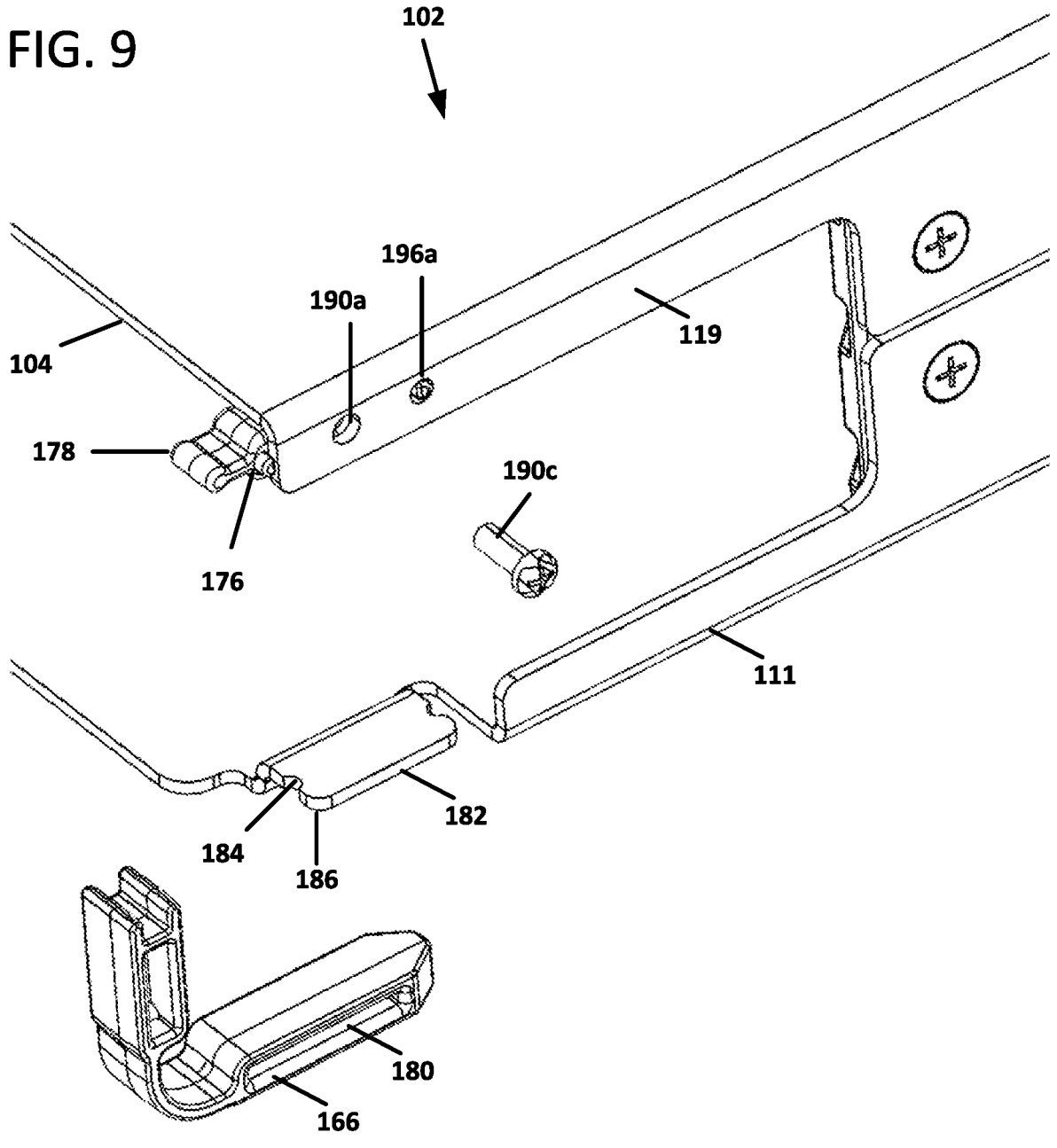
FIG. 9 is a perspective view of the chassis of FIG. 2 with the hinge part exploded from the chassis and the second retainer part assembled on the chassis.

As shown in FIG. 9, the bottom piece 111 of the chassis 102 includes a laterally extending tab 182. In certain implementations, the bottom piece 111 includes oppositely facing tabs 182 at the opposite sides 108, 110 of the chassis 102. Accordingly, the hinge part 162 can be mounted to the chassis 102 (e.g., to the bottom piece 111) by sliding the first mounting section 166 over one of the chassis tabs 182. In certain examples, a contoured guide surface 165 carried by a tray that mounts within the chassis 102 may extend laterally over the first mounting section 166 to guide fibers or other media out of the chassis 102.

Figure 10:
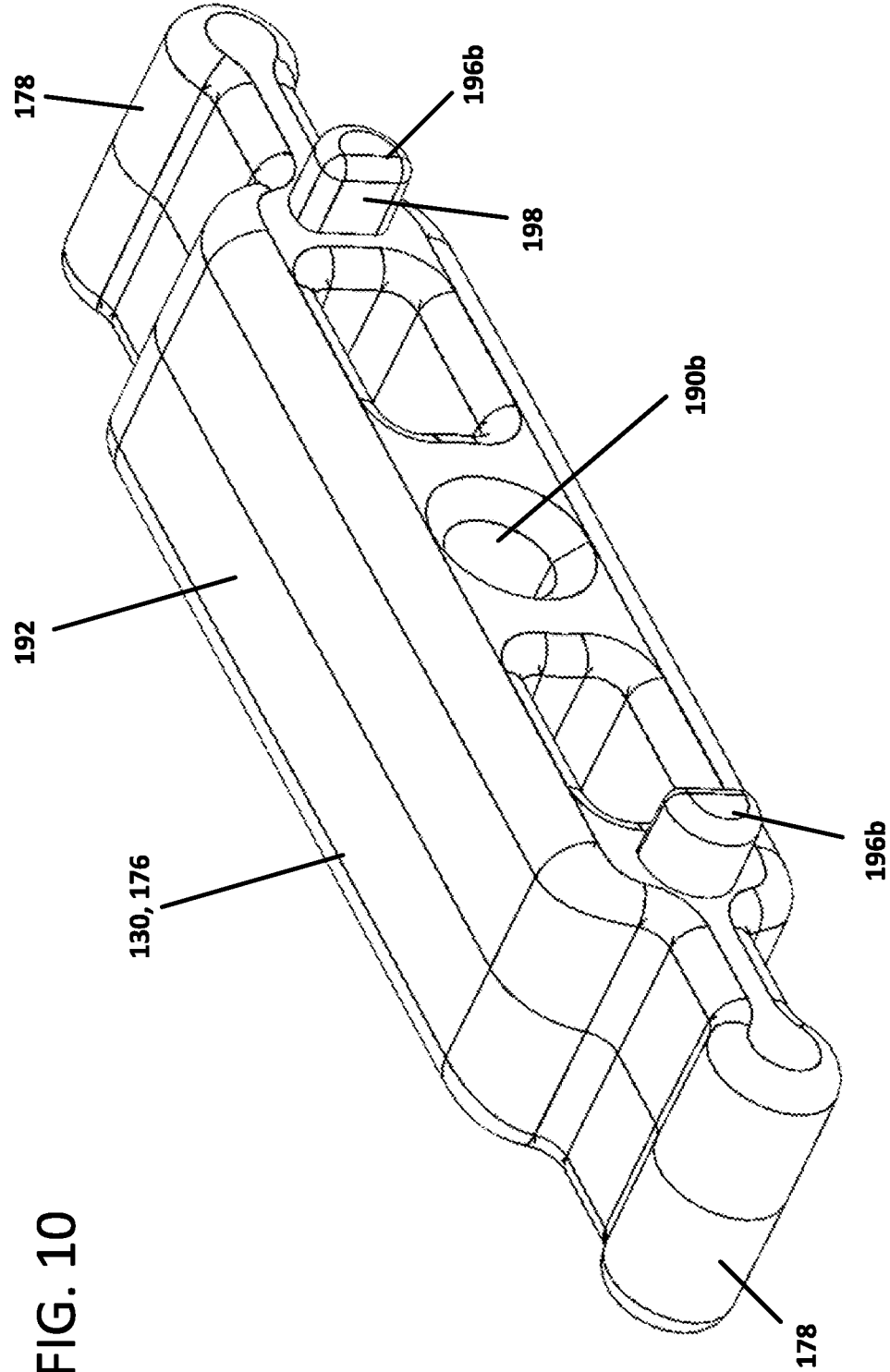
FIG. 10 is a perspective view of an example second retainer part suitable for use with the first hinge arrangement of FIG. 3.

In some implementations, as shown in FIGS. 9 and 10, the second retainer part 176 is mounted to the chassis 102 so that a retention post 178 extends forwardly of the front 104 of the chassis 102. In certain implementations, the second retainer part 176 is mounted to the top piece 113 of the chassis. The retention post 178 is sized to fit within the retaining section 174 of the first retainer part 170. In certain examples, the retention post 178 is sized to snap-fit into the retaining section 174.

In certain implementations, the second retainer part 176 is configured to be mounted to the chassis 102 at either the first side 108 or the second side 110. For example, the second retainer part 176 may include first and second retention posts 178 extending outwardly from a body 192 in opposite directions (e.g., see FIG. 10). In certain examples, alignment pegs 196*b* extend outwardly from a side of the body 192. In certain examples, the body 192 defines a fastener aperture 190*b*. In an example, the fastener aperture 190*b* is defined between the two alignment pegs 196*b*.

In the example shown in FIG. 9, each second retainer part 176 mounts to one of the flanges 119 of the top piece 113 so that a majority of the second retainer part 176 is disposed within the chassis 102. In certain examples, the flange 119 defines an opening 196*a* through which one of the alignment pegs 196*b* extends. In certain examples, each alignment peg 196*b* defines a flat surface 198 facing towards the other alignment peg 196*b*. When the second retainer part 176 is mounted to the flange 119 so that the first alignment peg 196*b* extends through the opening 196*a*, the second alignment peg 196*b* extends over a front edge of the top piece 113 so that the flat surface 198 abuts the front edge of the top piece 113. When so positioned, the fastener aperture 190*b* of the second retainer part 176 aligns with a fastener aperture 190*a* of the flange 119 to enable insertion of a fastener 190*c* through both to secure the second retainer part 176 to the chassis 102.

Figure 41:
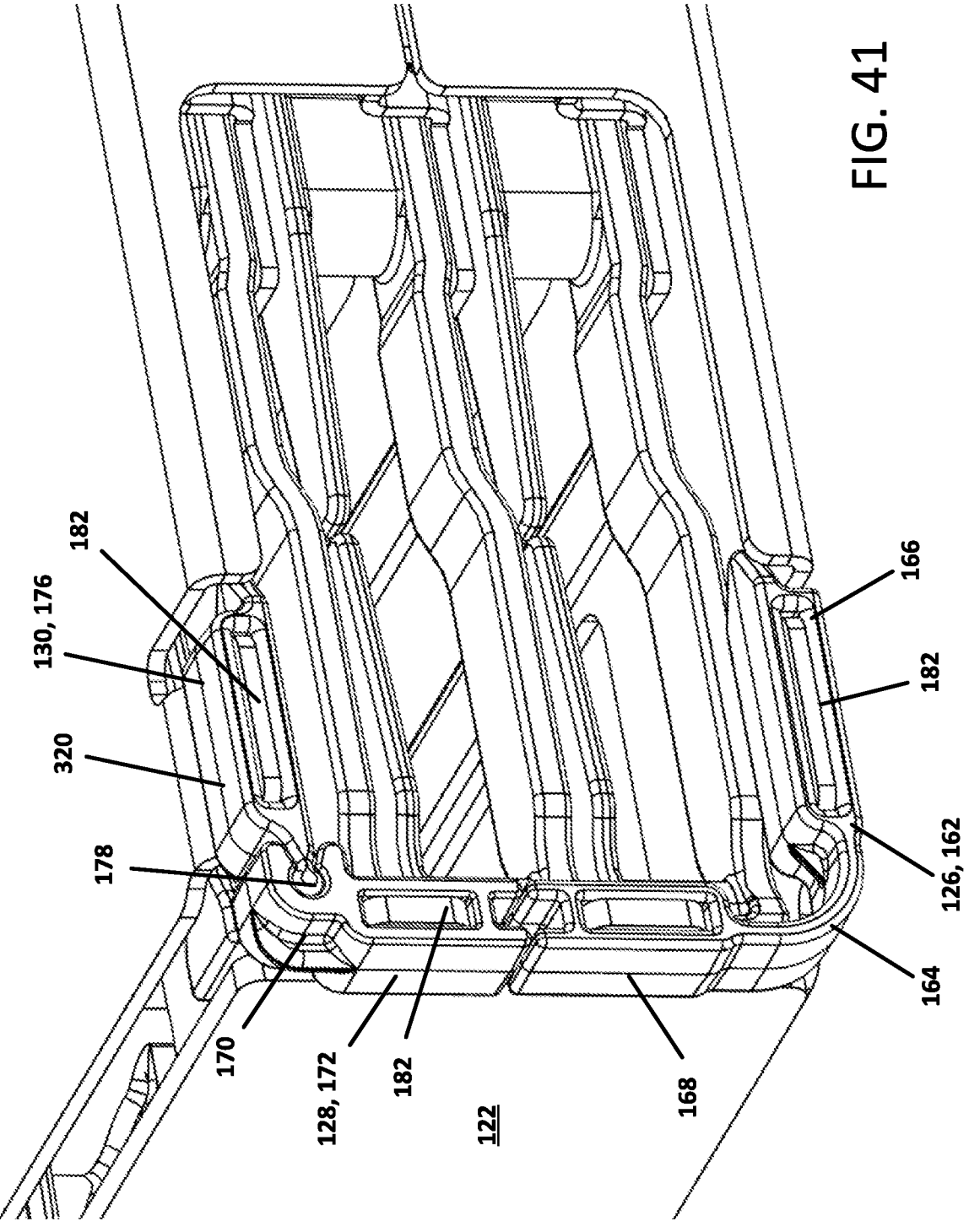
FIG. 41 shows the first hinge arrangement of FIG. 3 with an alternative implementation of a second retainer part holding the door in a closed position to block the front of the chassis.
Figure 42:
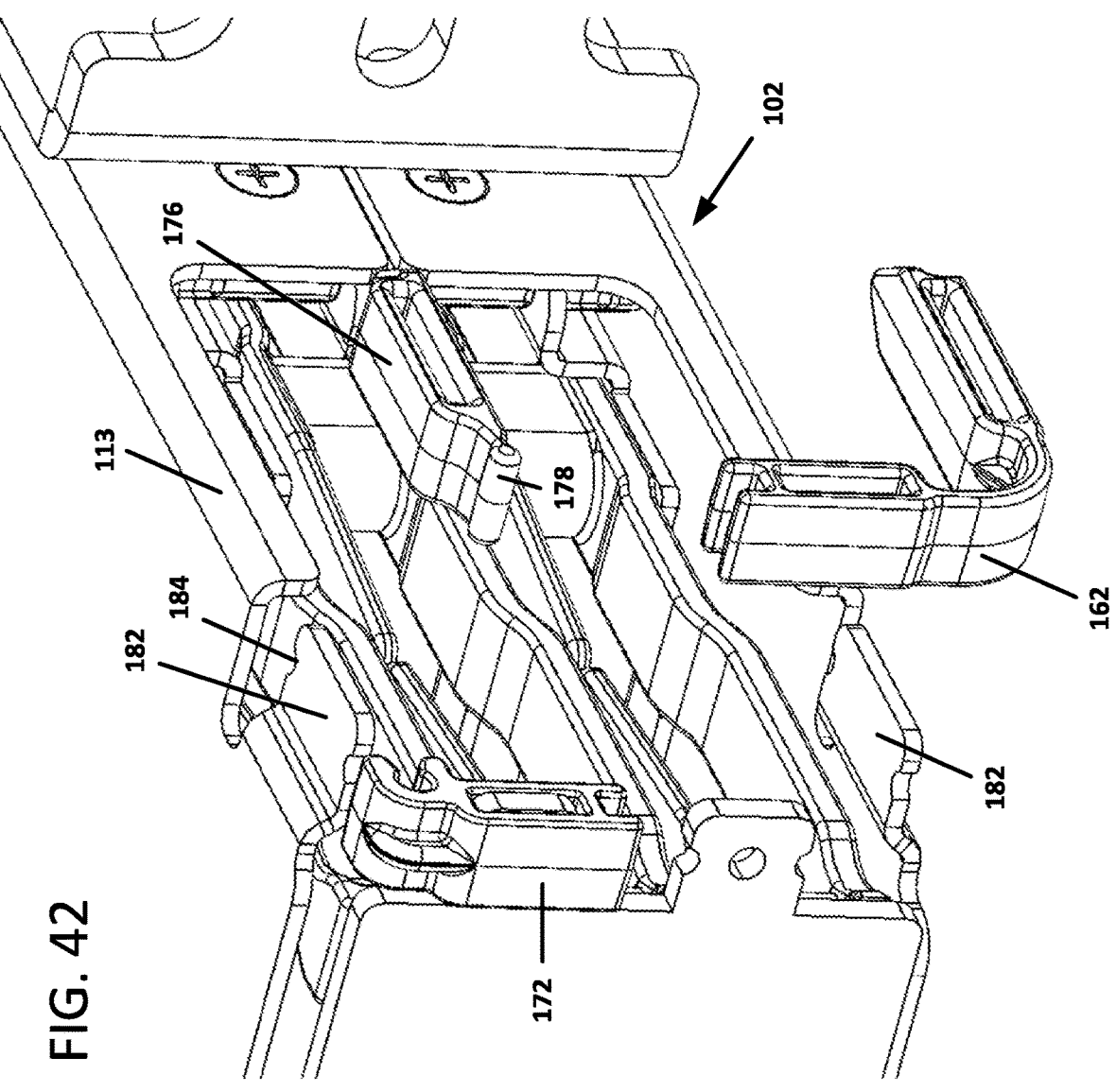
FIG. 42 shows the hinge part and the second retainer part exploded from the chassis of FIG. 41 for ease in viewing upper and lower chassis tabs.
Figure 43:
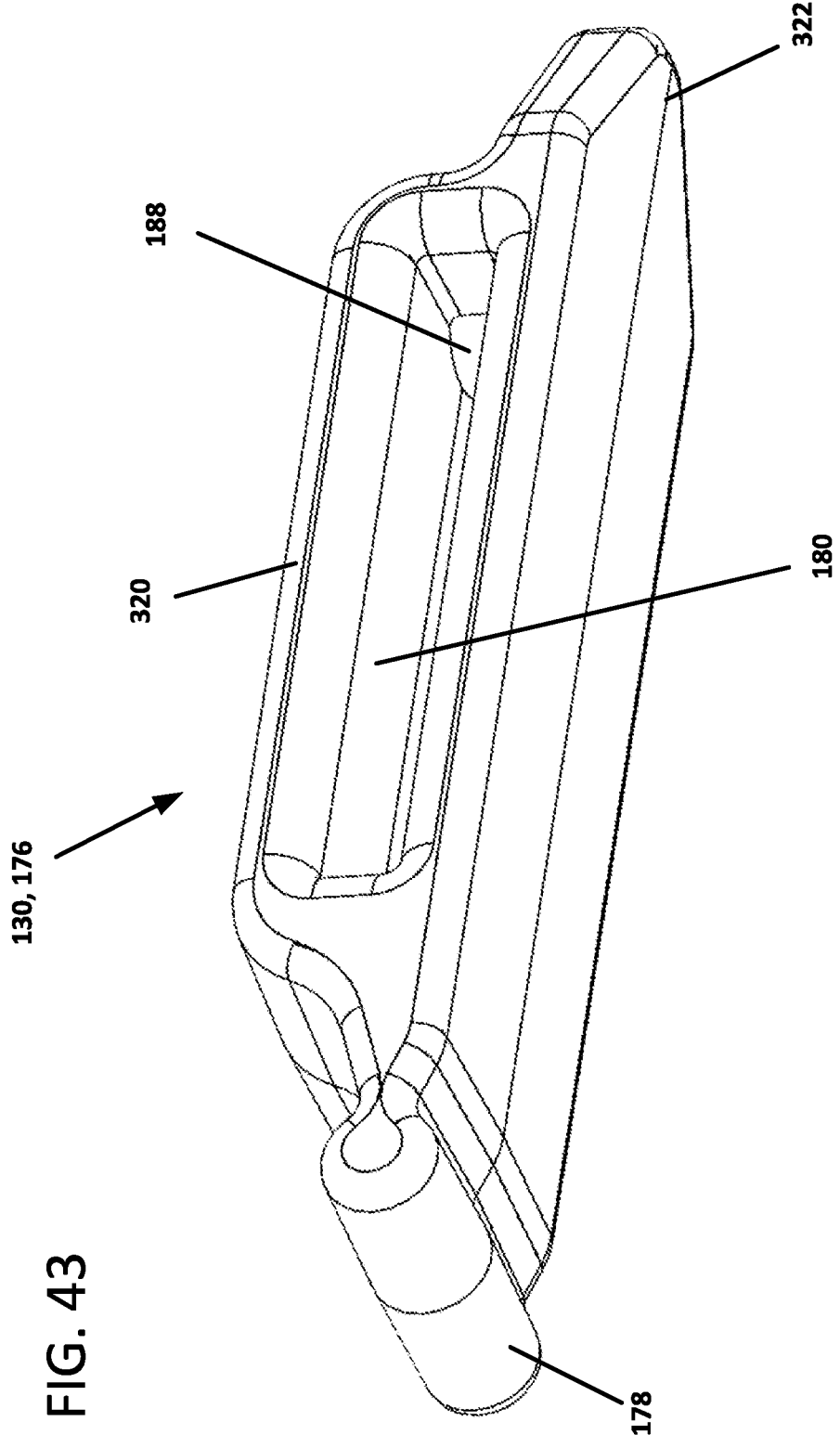
FIG. 43 is a perspective view of the alternative second retainer part of FIG. 41.

In other implementations, as shown in FIGS. 41-43, the second retainer part 176 is mounted to the chassis 102 in the same way as the hinge part 162. The top piece 113 of the chassis 102 includes a laterally extending tab 182 (e.g., see FIG. 42). In certain implementations, the top piece 113 includes oppositely facing tabs 182 at the opposite sides 108, 110 of the chassis 102. The second retainer part 176 includes mounting section 320 defining an opening 180 sized to receive the tab 182 extending from the top piece 113. In certain implementations, the tab 182 extending from the top piece 113 is the same as the tab 182 extending from the bottom piece 111.

In certain implementations, the mounting section 320 includes opposing protrusions 188 (e.g., bumps) sized and positioned to snap into the notches 184 when the tab 182 is disposed within the opening 180. Accordingly, the second retainer part 176 can be mounted to the chassis 102 to the top piece 113) by sliding the mounting section 320 over the upper chassis tab 182. Engagement between the protrusions 188 and the notches 184 retain the tab 182 within the opening 180. In certain examples, the tab 182 defines a contoured or tapered leading surface 186 that facilitates insertion of the tab 182 into the opening 180 (e.g., see FIG. 7).

In certain implementations, the second retainer part 176 includes only one retention post 178. In such implementations, the second retainer part 176 is configured to be mounted to only one side 108, 110 of the chassis 102 and a mirror-image of the second retainer part. 176 is configured to be mounted to the other side. In certain examples, the second retainer part 176 includes a tab or flange 322 that extends from an opposite end of the mounting section 320 as the retention post 178 (e.g., see FIG. 43). In certain examples, the tab 322 tapers inwardly as the tab 322 extends away from the mounting section 320.

Figure 12:
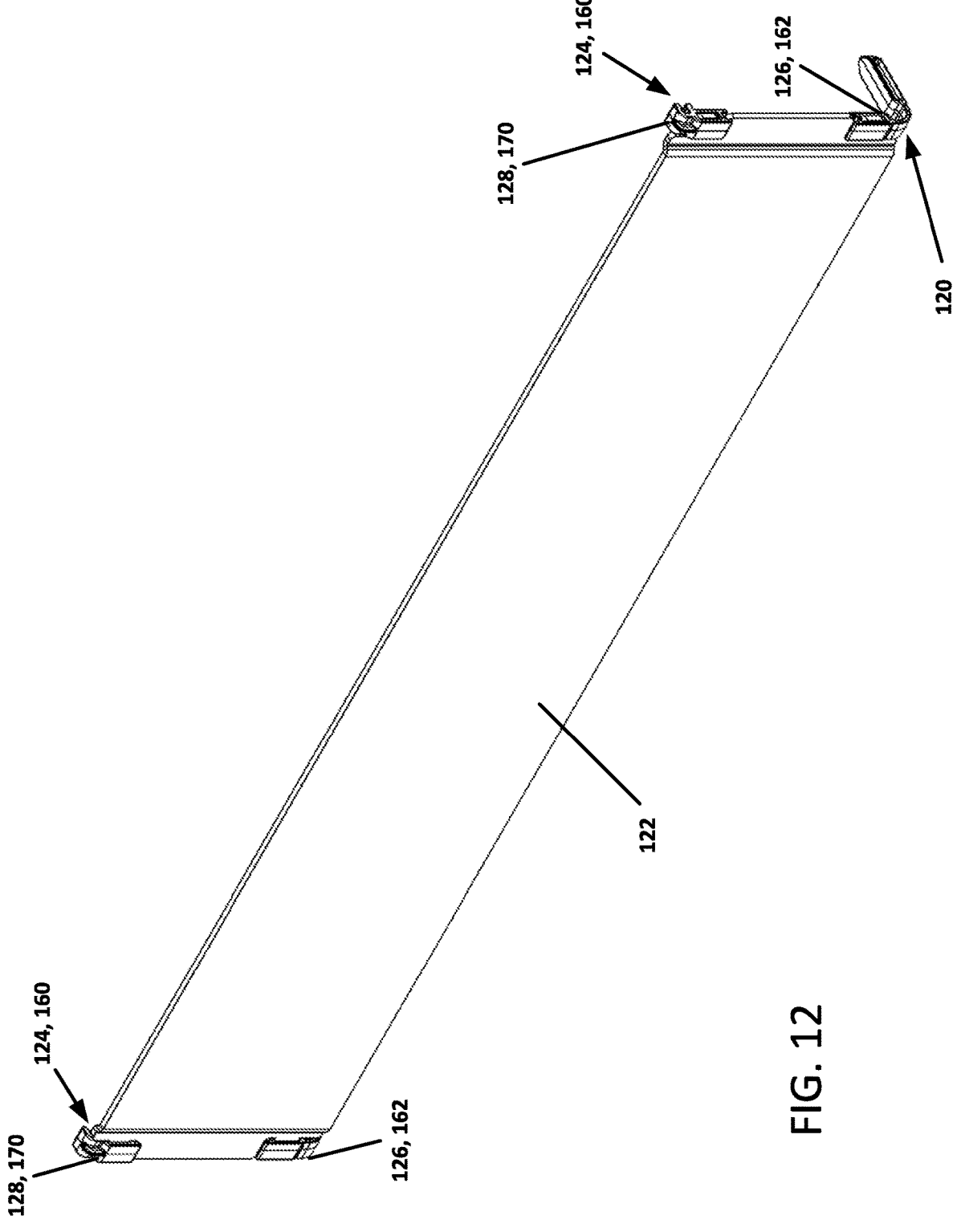
FIG. 12 is a perspective view of the first hinge arrangement mounted to a door (e.g., for a 2RU chassis) that is taller than the door (e.g., for a 1RU chassis) shown in FIG. 3.
Figure 13:
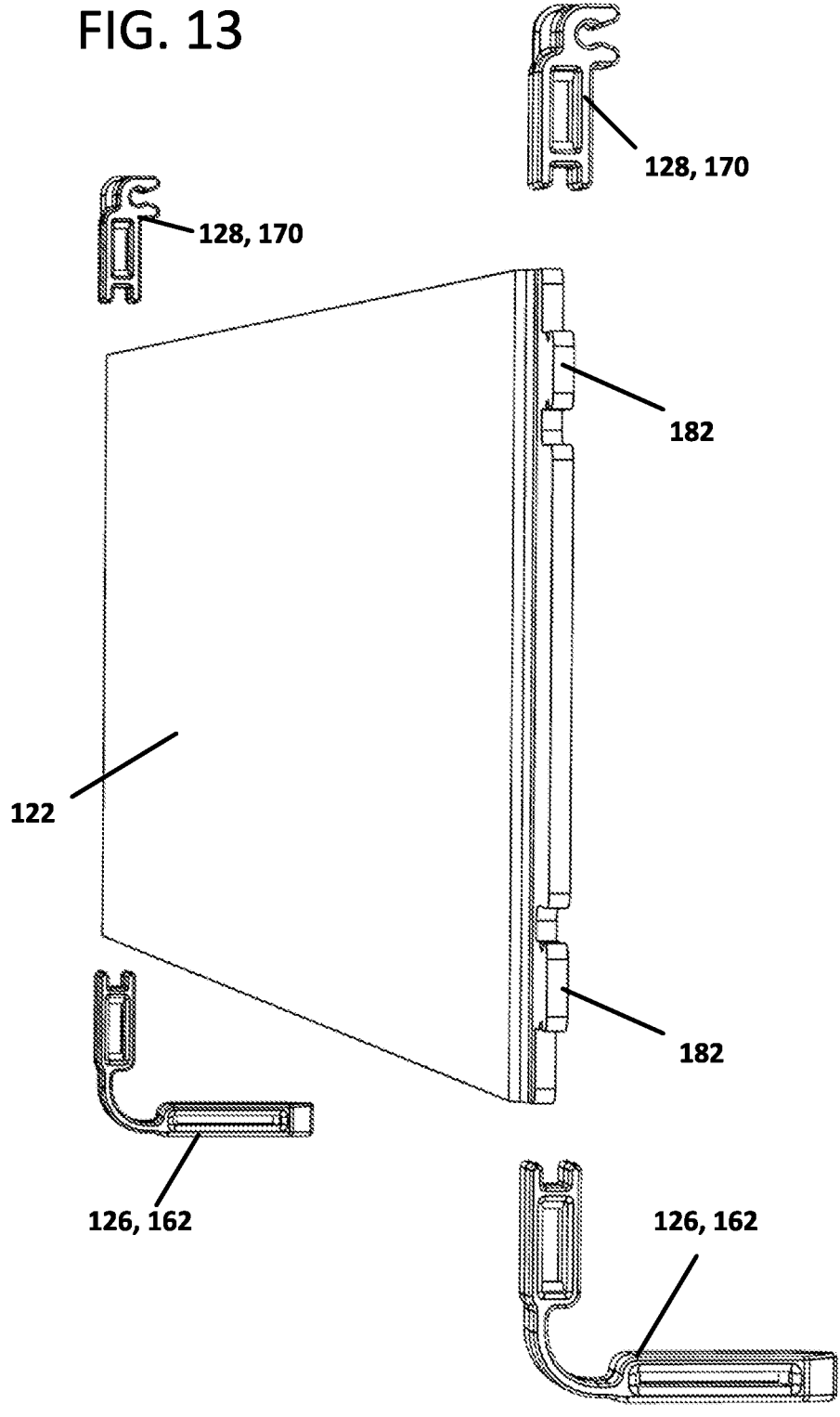
FIG. 13 shows the hinge part and the first retainer part exploded from the door of FIG. 12.
Figure 14:
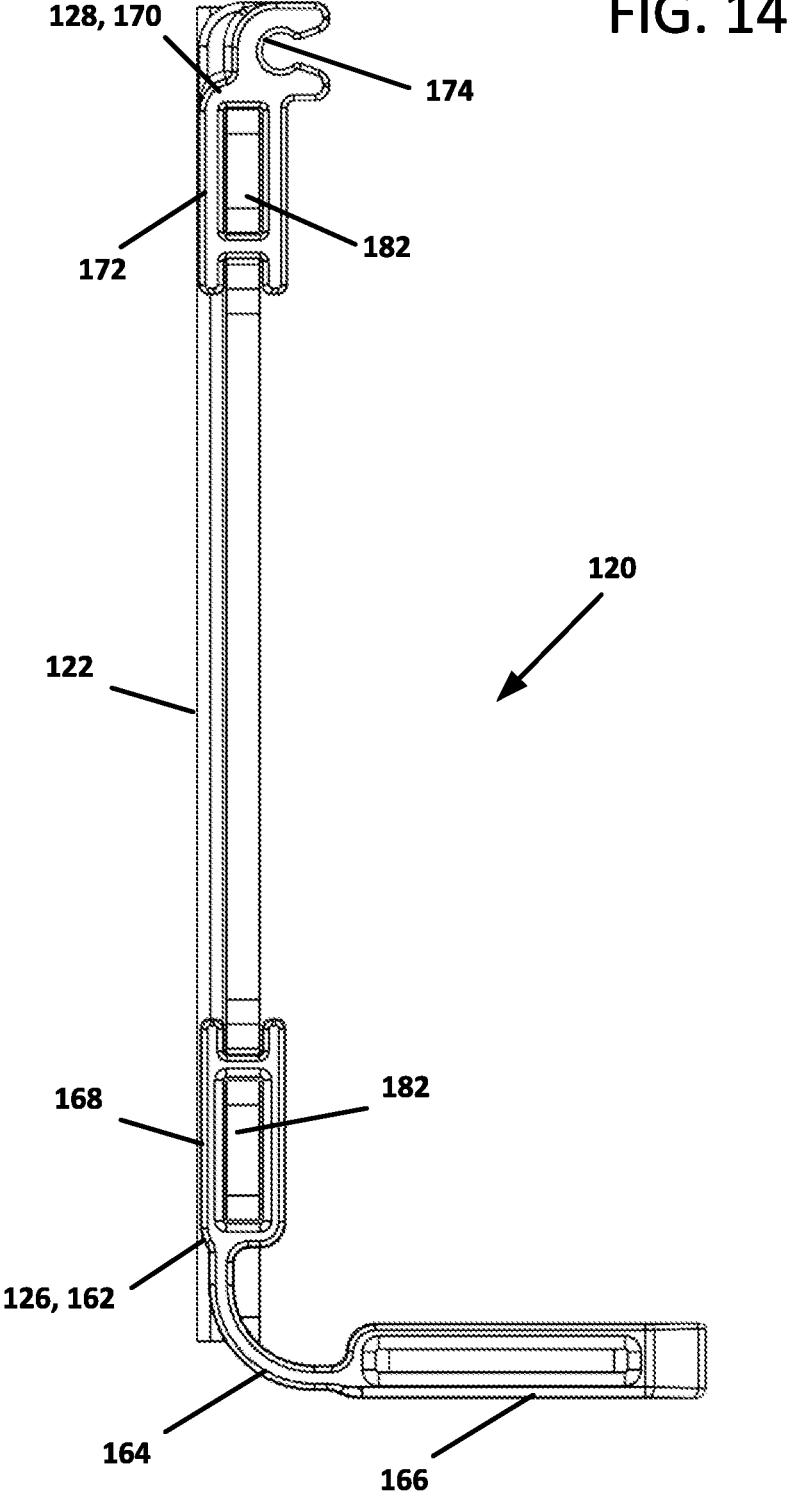
FIG. 14 is a side elevational view of the first hinge arrangement and door of FIG. 12.
Figure 15:
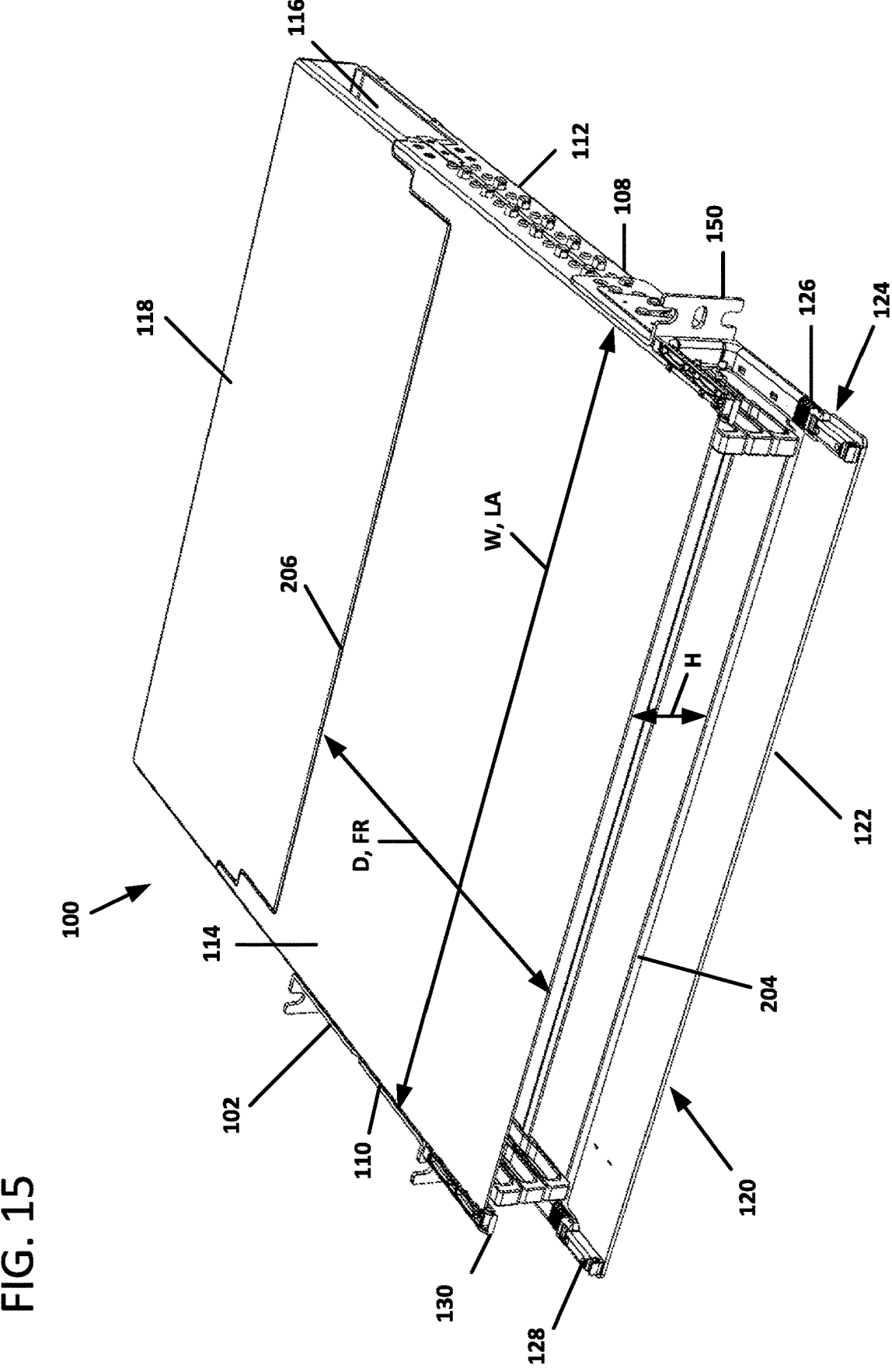
FIG. 15 is a perspective view of the chassis configured for use with a second example hinge arrangement.

In certain implementations, the latching arrangement 160 can be mounted to doors 122 of different sizes to accommodate a variety of chassis sizes. For example, FIGS. 3-11 illustrate the latching arrangement 160 mounted to a door 122 configured to close a 1RU chassis 102 whereas FIGS. 12-14 illustrate the latching arrangement 160 mounted to a door 122 configured to close a 2 RU chassis 102. Larger sizes are contemplated (e.g., a 3 RU chassis, a 4 RU chassis, a 5 RU chassis, a 6 RU chassis, etc.). In certain such implementations, the first retainer part 170 is spaced from the hinge part 162 along a height of the door 122. In certain examples, the hinge part 162 is mounted to the door 122 at the bottom of the door 122 and the first retainer part 170 is mounted to the door 122 at the top of the door 122 (e.g., see FIG. 14).

FIGS. 15-34 illustrate a second example implementation 240 of a hinge arrangement 124 for use in coupling the door 122 to the chassis 102. FIGS. 35-40 illustrate a mounting bracket arrangement 300 suitable for use in attaching the mounting bracket 150 to the chassis 102 of FIGS. 15-34. The bottom piece, top piece, and side pieces of the chassis 102 are modified to work with the second hinge arrangement 240 and the mounting bracket arrangement 300.

Figure 16:
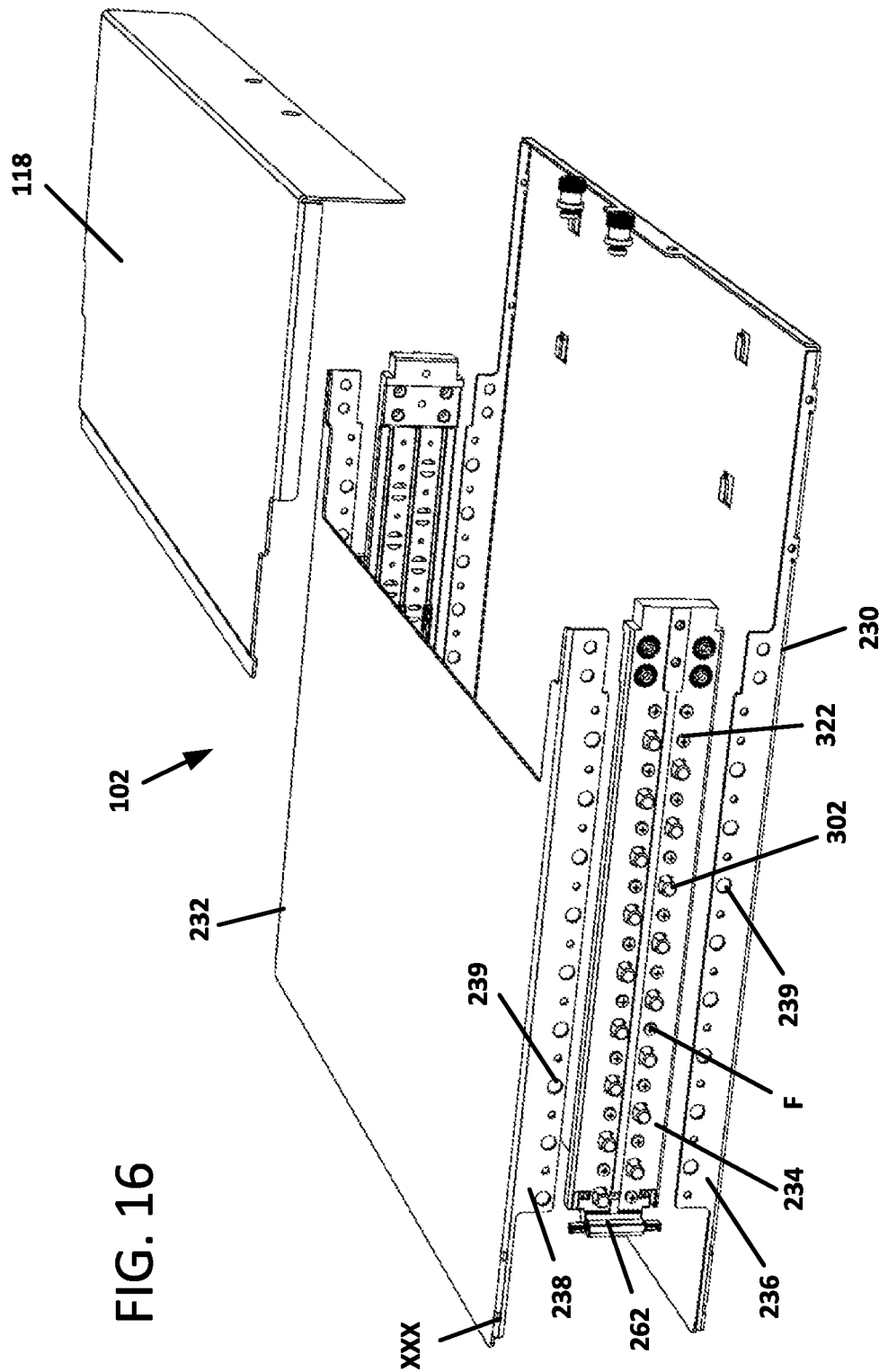
FIG. 16 shows the components of the chassis of FIG. 15 exploded away from each other for ease in viewing.

Referring to FIG. 16, the chassis 102 may be formed of a bottom piece 230, a top piece 232, and side pieces 234. In certain examples, the side pieces 234 defines tray guides at interior surfaces. The bottom piece 230 defines the bottom wall 112 of the chassis 202. The bottom piece 230 also includes side flanges 236 extending upwardly from the bottom wall 112. The top piece 232 defines the top wall 114 and includes side flanges 23$ extending downwardly from the top wall 114. Each of the side flanges 236, 238 defines apertures 239 that align with either guide pegs 302 or apertures 322 in the side pieces 234.

In some implementations, the guide pegs 302 are disposed in one or more rows extending along the depth D of the chassis at the sides 108, 110 of the chassis 102. In other implementations, the guide pegs 302 can be arranged in other configurations (e.g., a grid, circles, diamond shapes, crosses, etc). In some implementations, the side pieces 234 may define a row of fastener openings 322 and a row of guide pegs 302. In other implementations, the guide pegs 302 and fastener openings 322 can be mixed together in the same row. In the example shown, each side piece 234 defines a first row of alternating guide pegs 302 and fastener openings 322 to align with the apertures 239 of the bottom piece 230 and a second row of alternating guide pegs 302 and fastener openings 322 to align with the apertures 239 of the top piece 232.

The guide pegs 302 are inserted through the apertures 239 to hold the bottom and top pieces 230, 232 to the sidewalls 234 along the height H and depth D of the chassis 102. Fasteners F can be inserted through the aligned apertures 322 of the side pieces 234 and apertures 239 in the flanges 236, 238 to hold the bottom piece 230, the side pieces 234, and the top piece 232 together along the height H, depth D, and width W of the chassis 102, In other implementations, the bottom piece 230, top piece 232, and side pieces 234 can be latched together.

Figure 17:
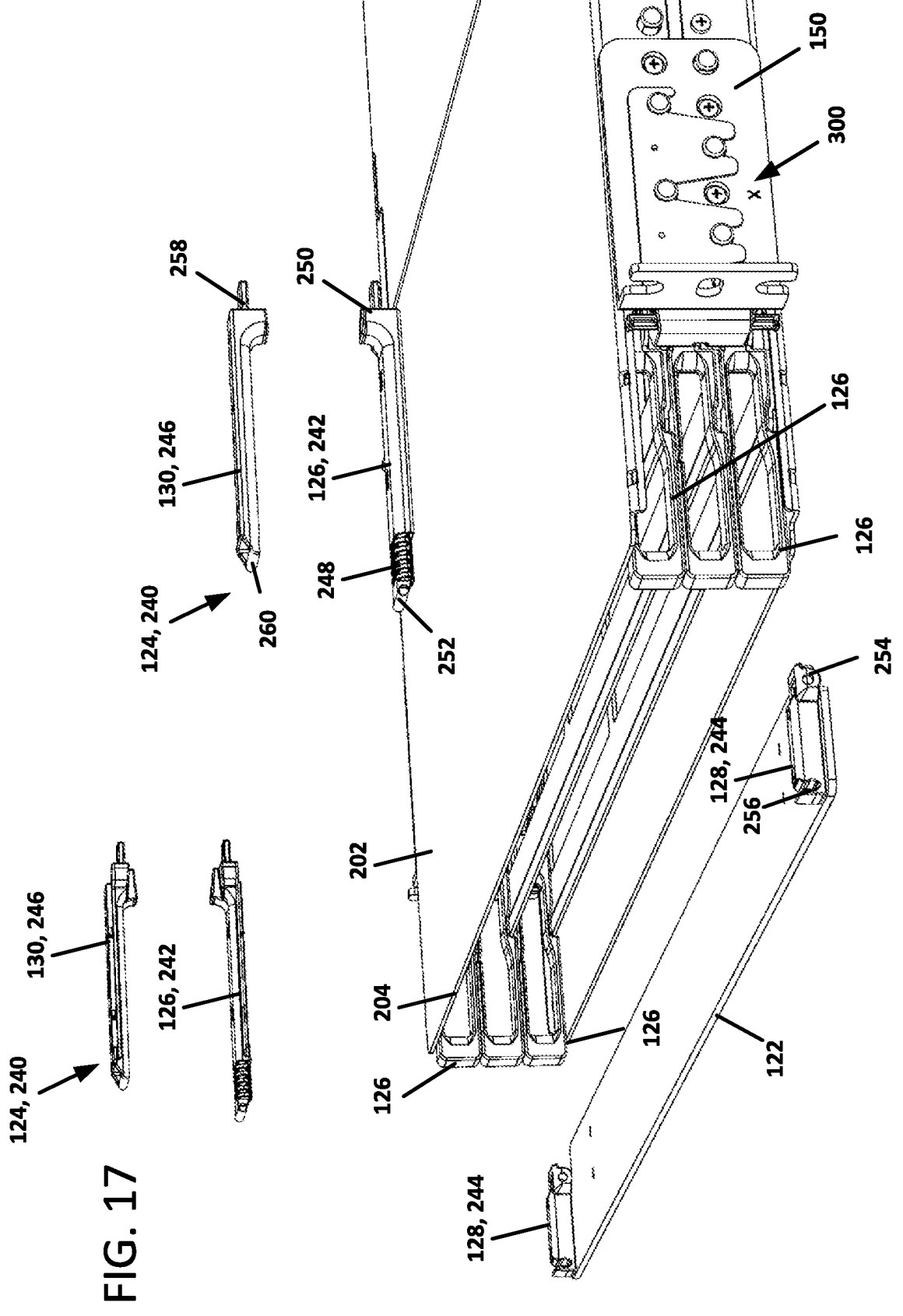
FIG. 17 is a perspective view of the chassis of FIG. 15 with components of the second hinge arrangement and the front door exploded from the chassis.

Referring to FIG. 17, the second hinge arrangement 240 includes a hinge part 242, a first retainer part 244, and a second retainer part 246, The hinge part 242 and the second retainer part 246 are configured to mount to the chassis 102 and the first retainer part 244 is configured to mount to the door 122. In certain implementations, the first retainer part 244 also mounts to the hinge part 242 to be movably connected directly to the hinge part 242, The first retainer part 244 selectively couples to the second retainer part 246 to releasably lock the door 122 in the closed position.

The hinge part 242 includes a living hinge 248 connecting a first mounting section 250 and a second mounting section 252. The first retainer part 244 extends between a first connecting region 254 and a second connecting region 256. The second retainer part 246 extends between a first mounting section 258 and a connecting region 260. The first connecting region 254 of the first retainer part 244 attaches to the second mounting section 252 of the hinge part 242. The second connection region 256 of the first retainer part 244 selectively engages (e.g., snap-fits to) the connection region 260 of the second retainer part 246.

Figure 18:
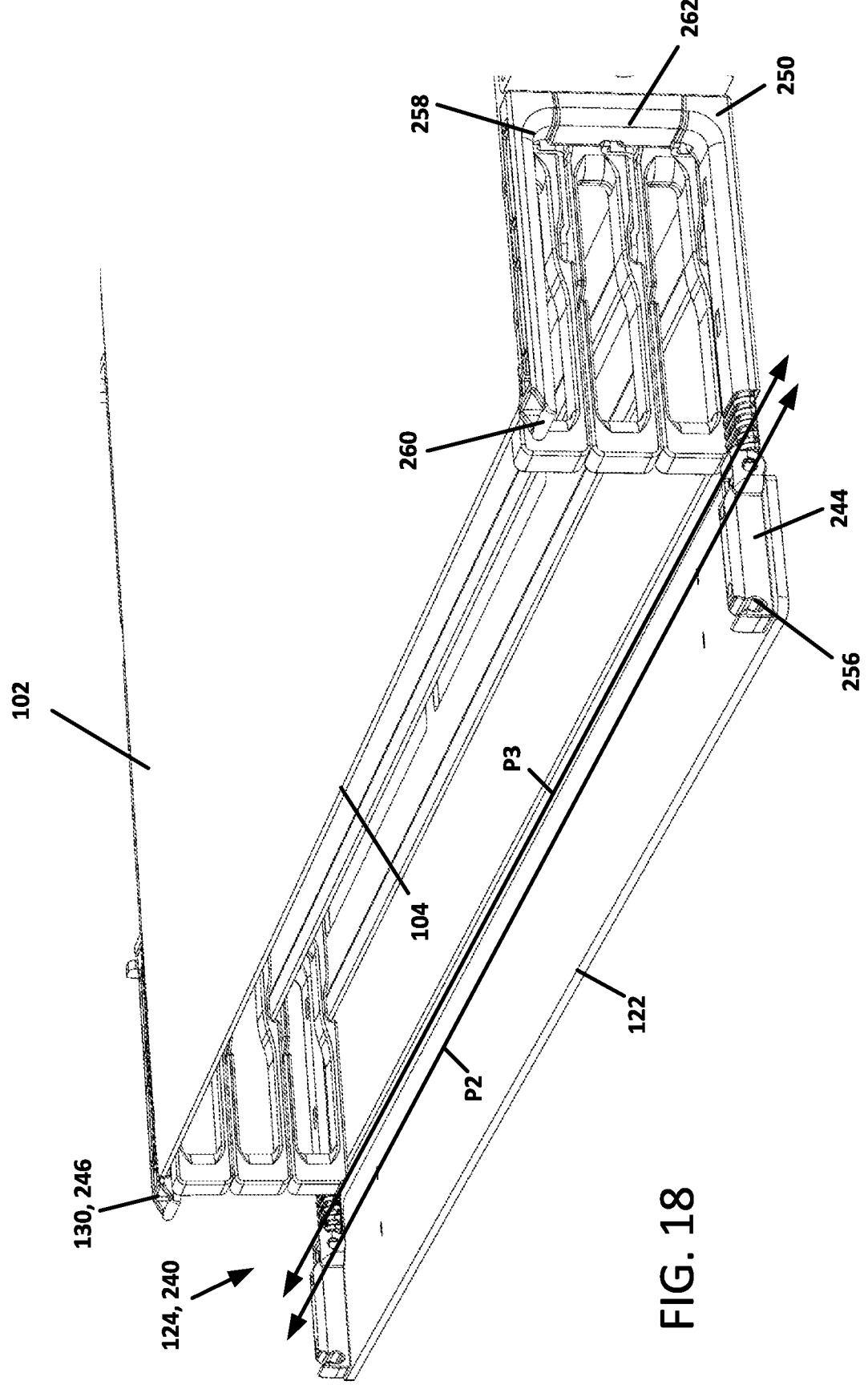
FIG. 18 shows the door of the chassis of FIG. 15 in an open/access position.

FIG. 18 shows the door 122 disposed in a first example access position in which the door 122 does not cover the front 104 of the chassis 102. The second hinge arrangement 240 is mounted to the chassis 102 and the door 122 to enable movement of the door 122 between the open and closed positions. In certain implementations, the hinge part 242 and second retainer part 246 are mounted to a support mount 262 of the chassis 102. The first mounting section 250 is configured to mount to the chassis 102 (e.g., to one of the side pieces 234) and the second mounting section 252 is configured to mount to the first retainer part 244.

In certain implementations, the second hinge arrangement 240 enables the door 122 to move about two separate axes P2, P3. The axes P2, P3 are parallel, but spaced from each other along the depth D of the chassis 102. In certain examples, the axes P2, P3 are spaced along the height 14 of the chassis 102. The first retainer part 244 is pivotally or rotatable coupled to the hinge part 242 to enable the first retainer part 244 to pivot or rotate about the first pivot axis P2 relative to the hinge part 242. In addition, the living hinge 248 of the hinge part 242 bends, flexes, or deforms so that the second mounting section 252 moves about the second axis P3 relative to the first mounting section 250 (e.g., see FIG. 24).

Figure 19:
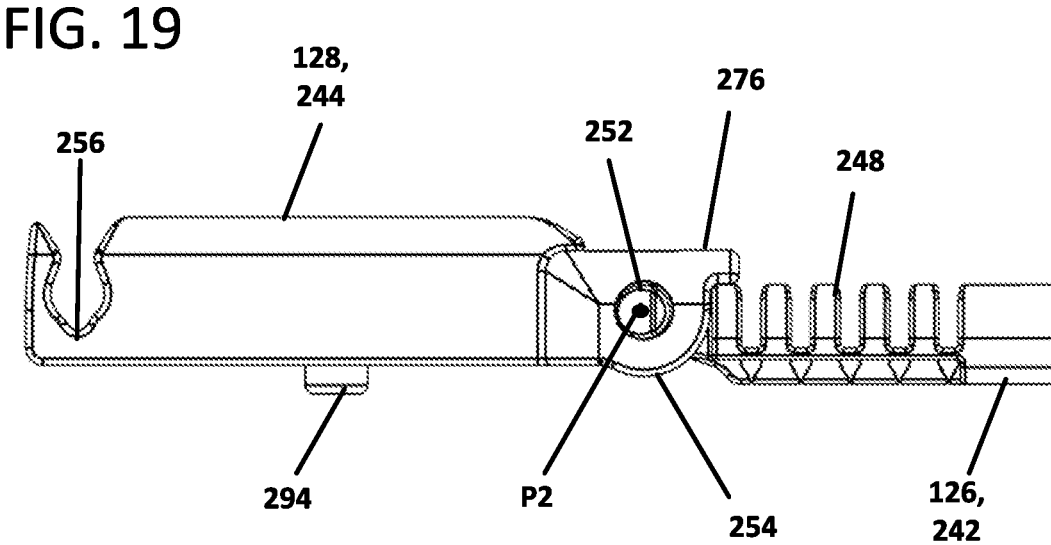
FIG. 19 is a side elevational view of the connection between the hinge part and the first retainer part of the second hinge arrangement of FIG. 15, the first retainer part being shown in a first position.
Figure 20:
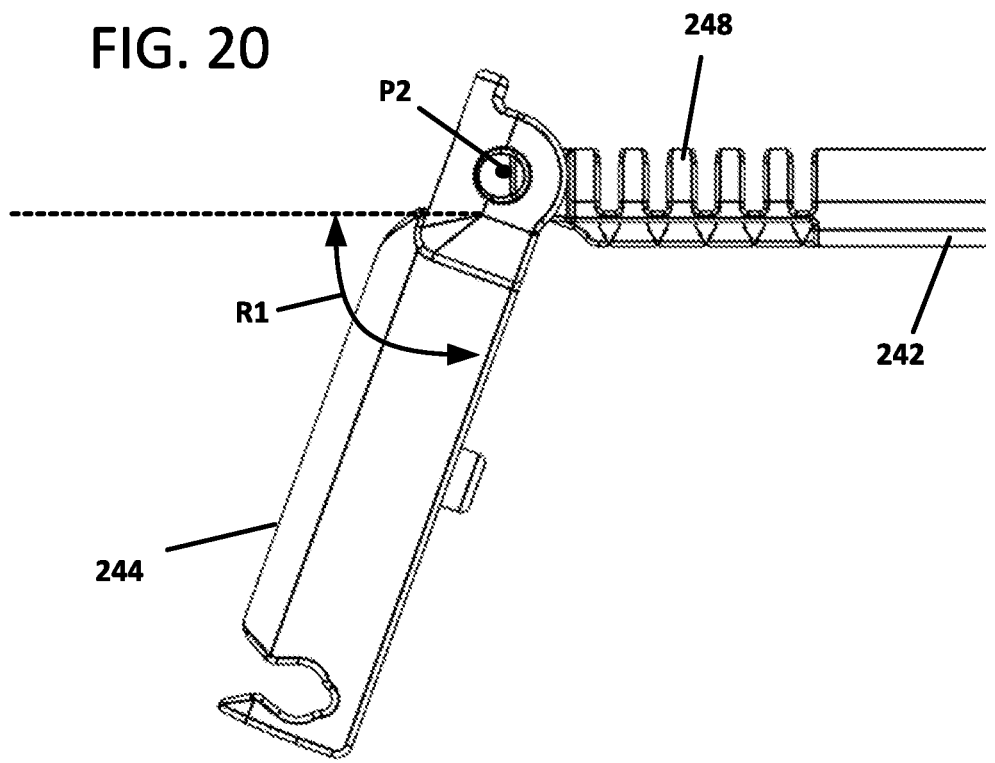
FIG. 20 shows the first retainer part of FIG. 20 in a second position that is rotated about a pivot axis from the first position of FIG. 19.

Movement between the first retainer part 244 and the hinge part 242 about the first axis P2 is shown in FIGS. 19 and 20. In certain implementations, the first retainer part 244 is configured to pivot about the second mounting section 252 (e.g., a hinge post) of the hinge part 242. In certain examples, the range of motion RI about which the first retainer part 244 moves about the axis P2 is limited. For example, the first retainer part 244 may move from a first position extending generally parallel with a main body of the hinge part 242 (e.g., see FIG. 19) to a second position extending downwardly from the hinge part 242 (e.g., see FIG. 20).

In certain implementations, the mounting section 254 of the first retainer part 244 defines openings in which the second mounting section 252 (e.g., a hinge pin) of the hinge part 242 is mounted. The mounting section 254 can rotate about the hinge pin 252. In certain examples, the mounting section 254 includes a limiter flange 276 that engages the hinge part 242 (e.g., the living hinge 248) when the first retainer 244 is disposed in the first position. The limiter flange 276 inhibits continued rotation of the first retainer 244 in a first rotational direction relative to the hinge part 242. In certain examples, rotation of the first retainer 244 in an opposite rotational direction also is limited. In some examples, rotation in the opposite direction is limited by engagement between the first retainer 244 and the hinge part 242. In other examples, rotation in the opposite direction is limited by engagement between the door 122 and the hinge part 242.

Figure 21:
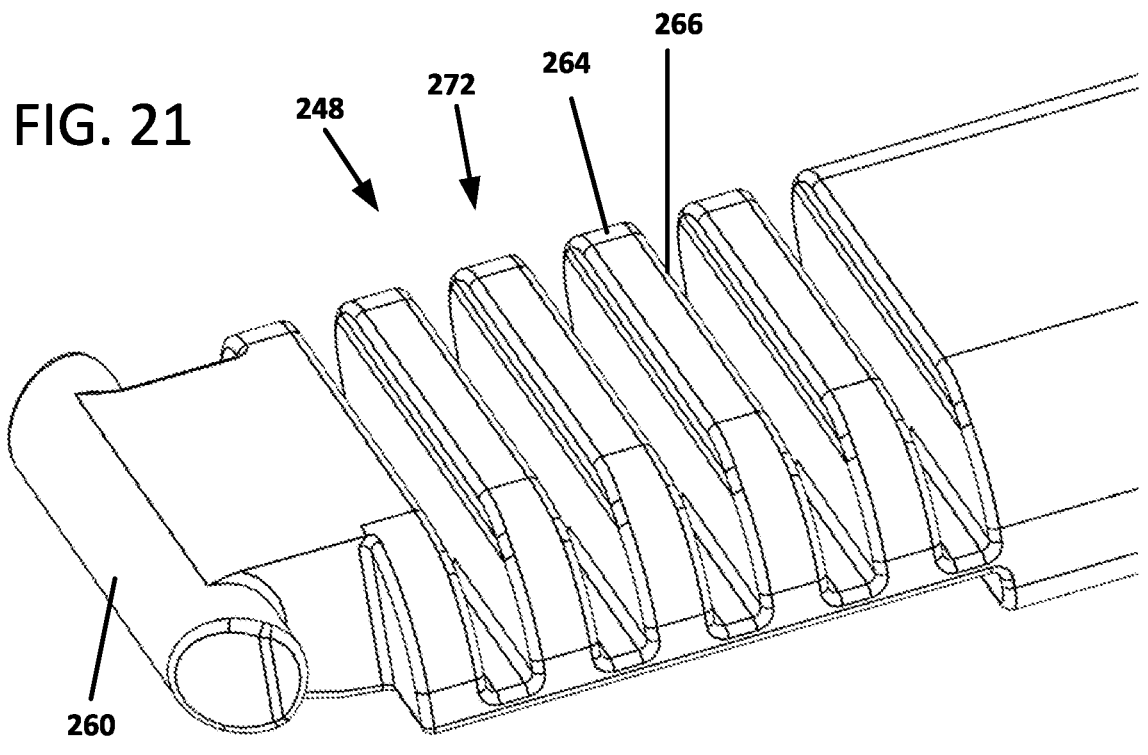
FIG. 21 is a top perspective view of the second mounting section and living hinge of the hinge part of the second hinge arrangement of FIG. 15.
Figure 22:
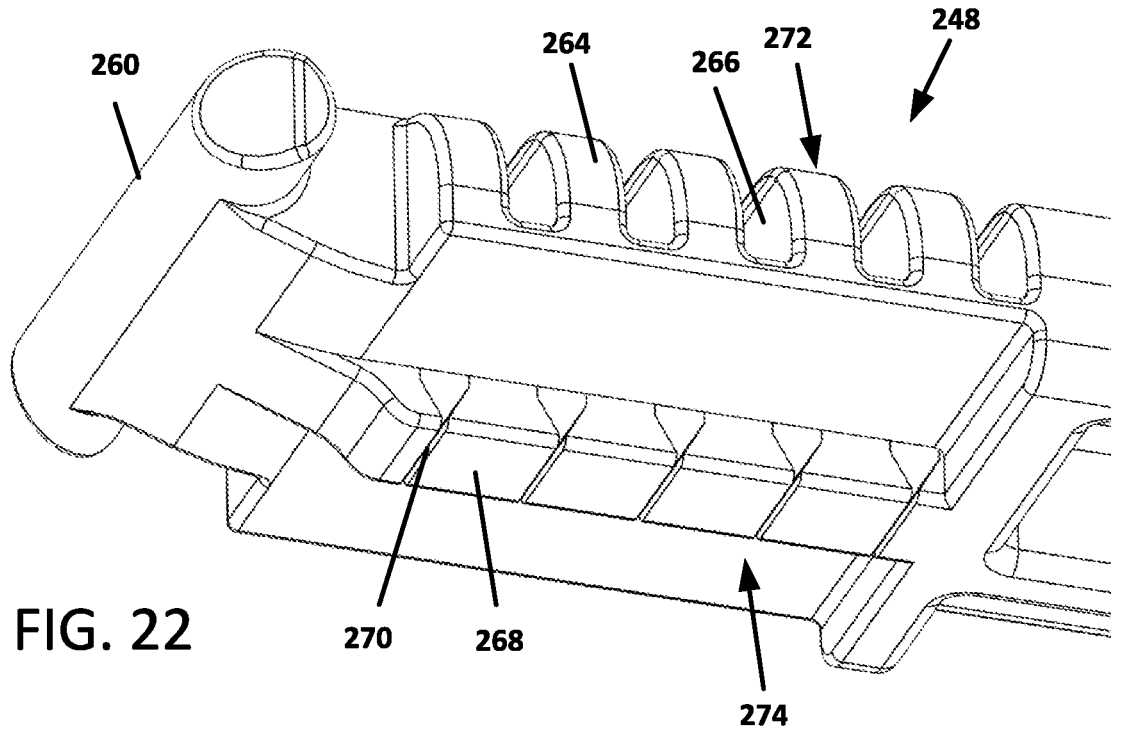
FIG. 22 is a bottom perspective view of the second mounting section and living hinge of the hinge part of FIG. 21.

FIGS. 21 and 22 illustrate one example implementation of a living hinge 248 suitable for use with the hinge part 242. The living hinge 248 has a first major side 272 and an opposite second major side 274. In the example shown in FIG. 18, the first major side 272 is oriented to face towards the top wall 114 of the chassis 102 and the second major side 274 is oriented to face towards the bottom wall 112 of the chassis 102. The living hinge 248 defines a first plurality of notches or cuts 266 at the first side 272 to define separate ribs 264. In certain examples, the living hinge 248 defines a second plurality of notches or cuts 270 at the second side 274 to define separate ribs 268. In certain implementations, the notches 266 at the first side 272 are larger (e.g., along the depth D of the chassis 102 and/or along the height H of the chassis 102) than the notches 270 at the second side 274. Accordingly, the ribs 264 at the first side 272 of the living hinge 248 are spaced farther apart along the depth D of the chassis 102 than the ribs 268 at the second side 274. In certain implementations, the ribs 268 at the second side having a different shape than the ribs 264 at the first side 272.

Figure 23:
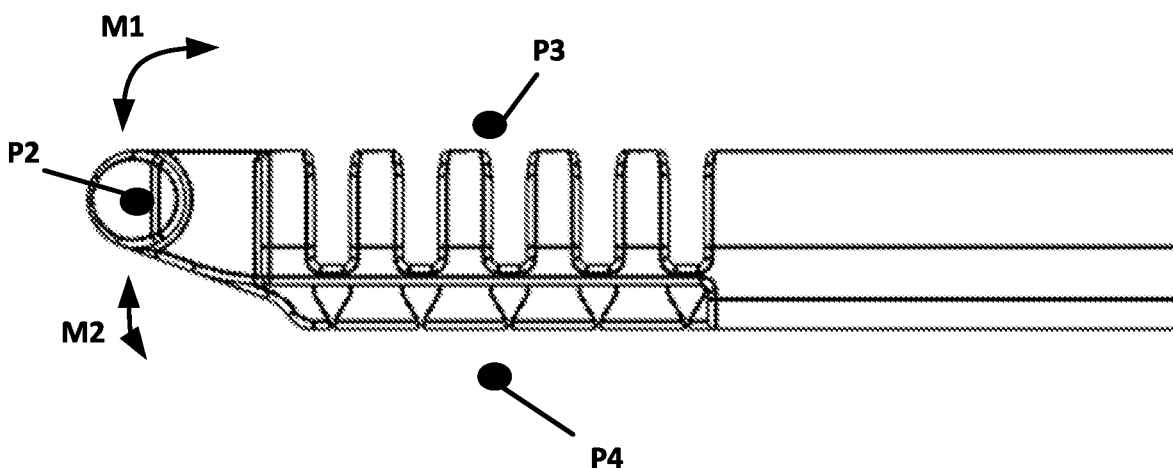
FIG. 23 is a side elevational view of the second mounting section and living hinge of the hinge part of FIG. 21.
Figure 24:
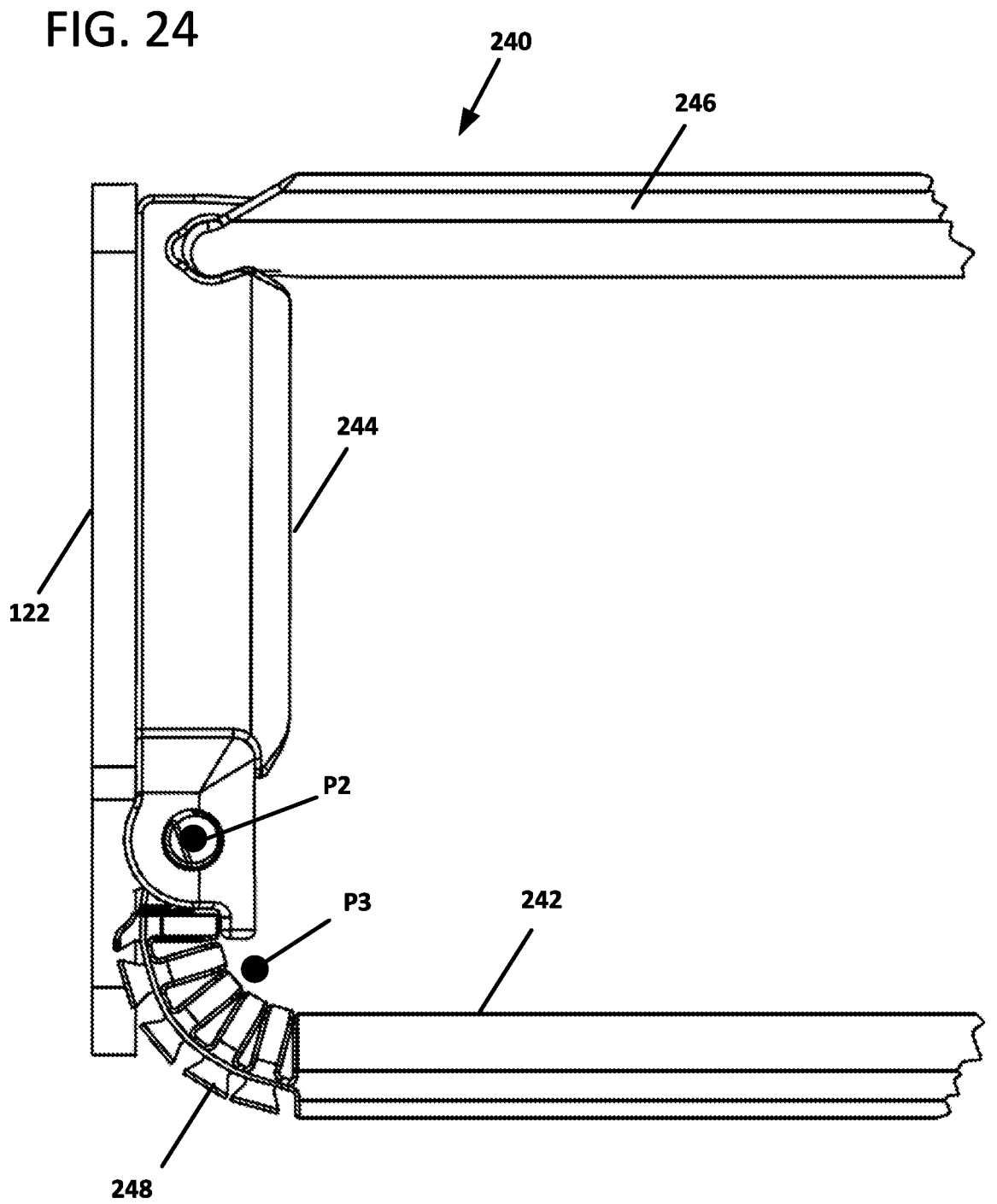
FIG. 24 shows the living hinge of FIG. 23 deflected to a first flexed position in which the first retainer part engages the second retainer part.
Figure 26:
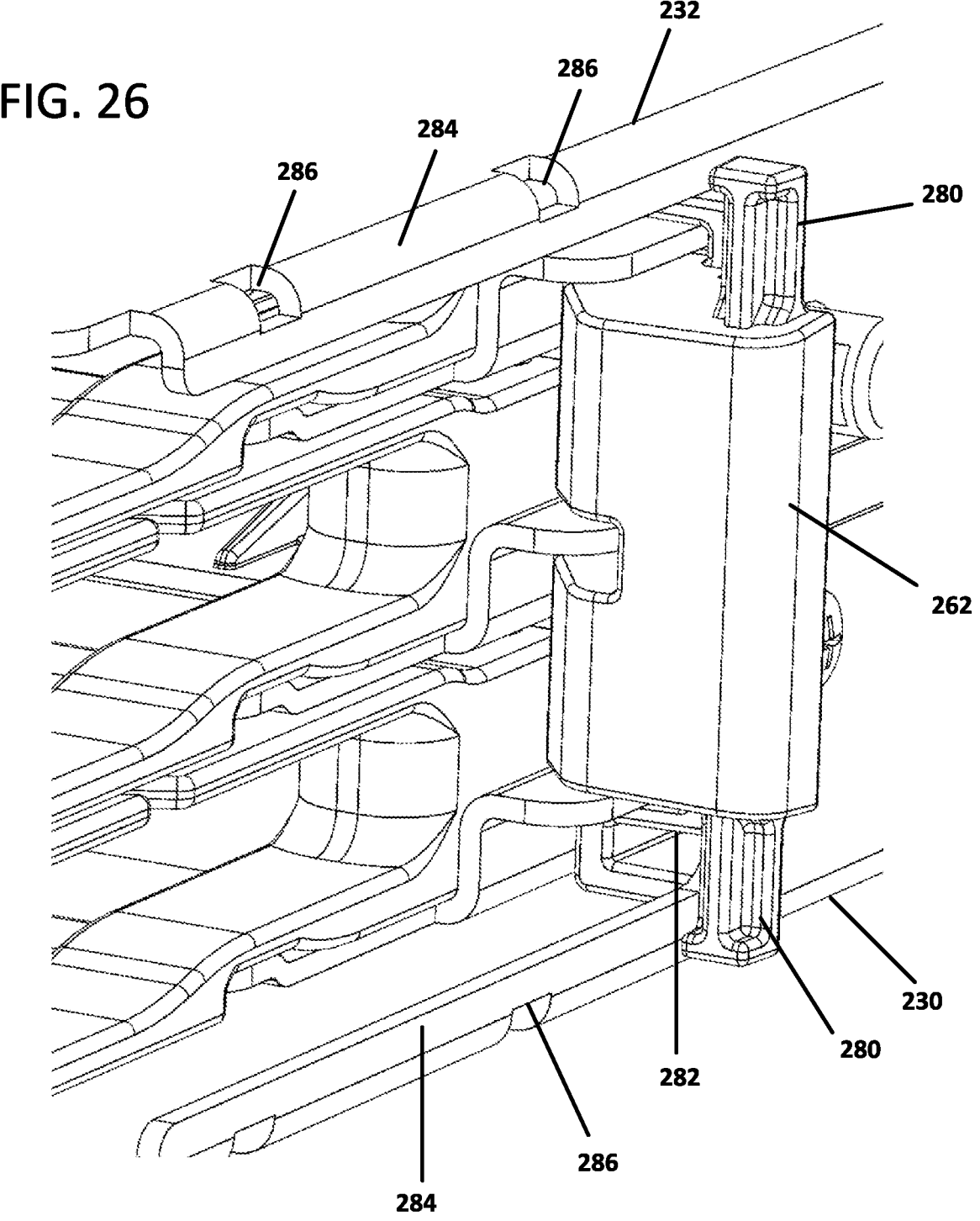
FIG. 26 is a perspective view of an example support mount of the chassis of FIG. 16.

As shown by FIGS. 23-24, the living hinge 248 flexes about the second axis P3 from a neutral position (e.g., see FIG. 23) to a first flexed position (e.g., see FIG. 24). As the term is used herein, the neutral position of the living hinge 248 refers to the position the living hinge 248 assumes when not acted on by external forces (e.g., the weight of the door 122, the pressure manually applied by a user, etc.). In certain examples, the second mounting section 252 moves through a range of motion M1 between the neutral and first flexed positions. The range of motion M1 is limited by the size of the notches 266 at the first side 272, The ribs 264 at the first side 272 touch each other when the living hinge 248 is disposed in the first flexed position.

In certain examples, the range of motion M1 is between 10 degrees and 120 degrees. In certain examples, the range of motion M1 is between 45 degrees and 110 degrees. In certain examples, the range of motion M1 is between 60 degrees and 100 degrees. In certain examples, the range of motion M1 is between 70 degrees and 90 degrees. In certain examples, the range of motion M1 is between 45 degrees and 85 degrees. In the example shown, the living hinge 248 is configured to flex about 90 degrees between the neutral position and the first flexed position.

Figure 25:
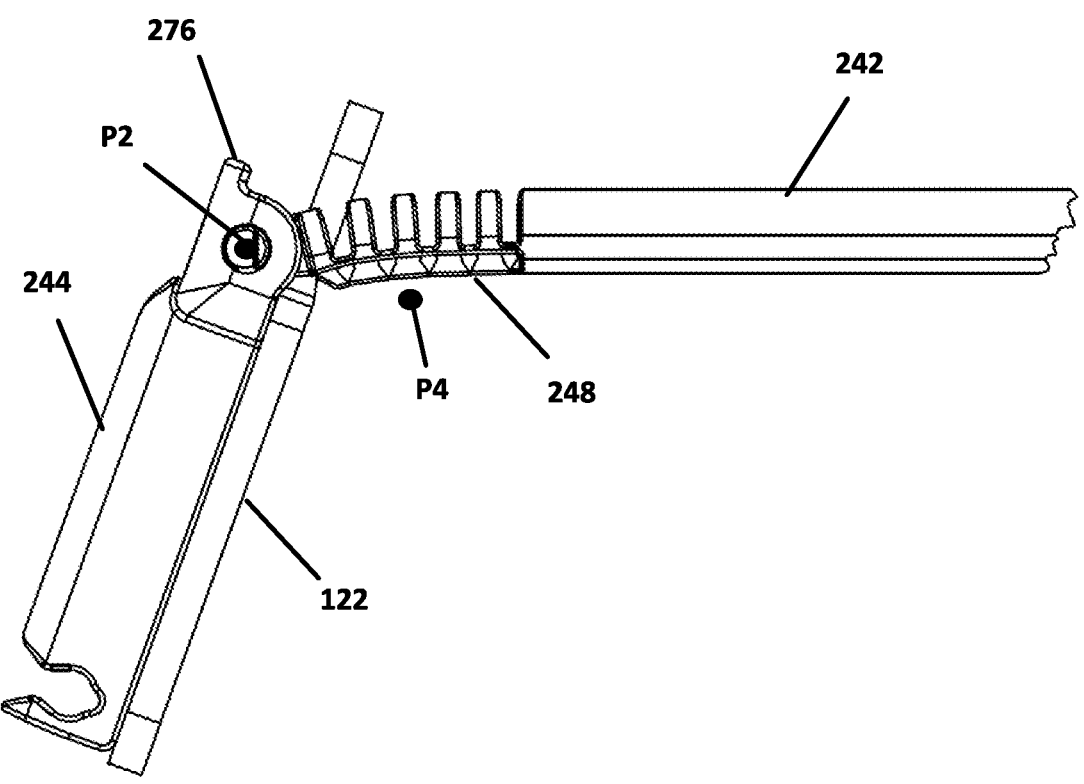
FIG. 25 shows the living hinge of FIG. 23 deflected away from the second retainer part, past the neutral position, to a second flexed position.

In certain implementations, the living hinge 248 also flexes about a third axis P4 from the neutral position to a second flexed position (e.g., see FIG. 25). In certain examples, the second mounting section 252 of the hinge part 242 moves through a range of motion M2 between the neutral and second flexed positions. The range of motion M2 is limited by the size of the notches 270 at the first side 274. The ribs 268 at the second side 274 touch each other when the living hinge 248 is disposed in the second flexed position.

In certain examples, the second range of motion M2 is less than the first range of motion M2. For example, the ribs 268 are closer together than the ribs 264. In certain implementations, the range of motion M2 is between 0 degrees and 45 degrees. In certain examples, the range of motion M2 is between 5 degrees and 35 degrees. In certain examples, the range of motion M2 is between 10 degrees and 25 degrees. In certain examples, the range of motion M2 is between 15 degrees and 20 degrees. In certain examples, the range of motion M2 is between 10 degrees and 20 degrees.

The door 122 is disposed in the closed position when the living hinge 248 is disposed in the first flexed position and the first retainer part 244 is disposed in the first position. In some implementations, the door 122 is disposed in the access position when the living hinge 248 is disposed in the neutral position. In other implementations, the door 122 is disposed in the access position when the living hinge 248 is disposed in the second flexed position (or any position along the second range of motion M2).

In some implementations, the first retainer part 244 is disposed in the first position when the door 122 is in the access position (e.g., see FIG. 18). Positioning the first retainer part 244 in the first position while the living hinge 248 is disposed in the second flexed position results in a door 122 disposed below the bottom wall 112 of the chassis, thereby leaving the front 104 of the chassis fully clear for inserting and/or removing equipment. In other implementations, the first retainer part 244 is disposed in the second position when the door 122 is in the access position (e.g., see FIG. 25). Moving the first retainer part 244 to the second position moves the door 122 closer to parallel with the front 104 of the chassis 102, thereby providing more standing room in front of the chassis 102.

FIGS. 26-34 illustrate how the components of the second hinge arrangement 240 mount to the chassis 102. In certain implementations, each of the side parts 234 includes a support mount 262 having first and second support posts 280 extending in opposite directions along the height H of the chassis 102 (e.g., see FIG. 26). The side part 234 also defines first and second slots or pockets 282 extending along a depth D of the chassis 102. The bottom and top pieces 230, 232 each include an overhang flange 284 defining one or more apertures 286.

Figures 27, 28:
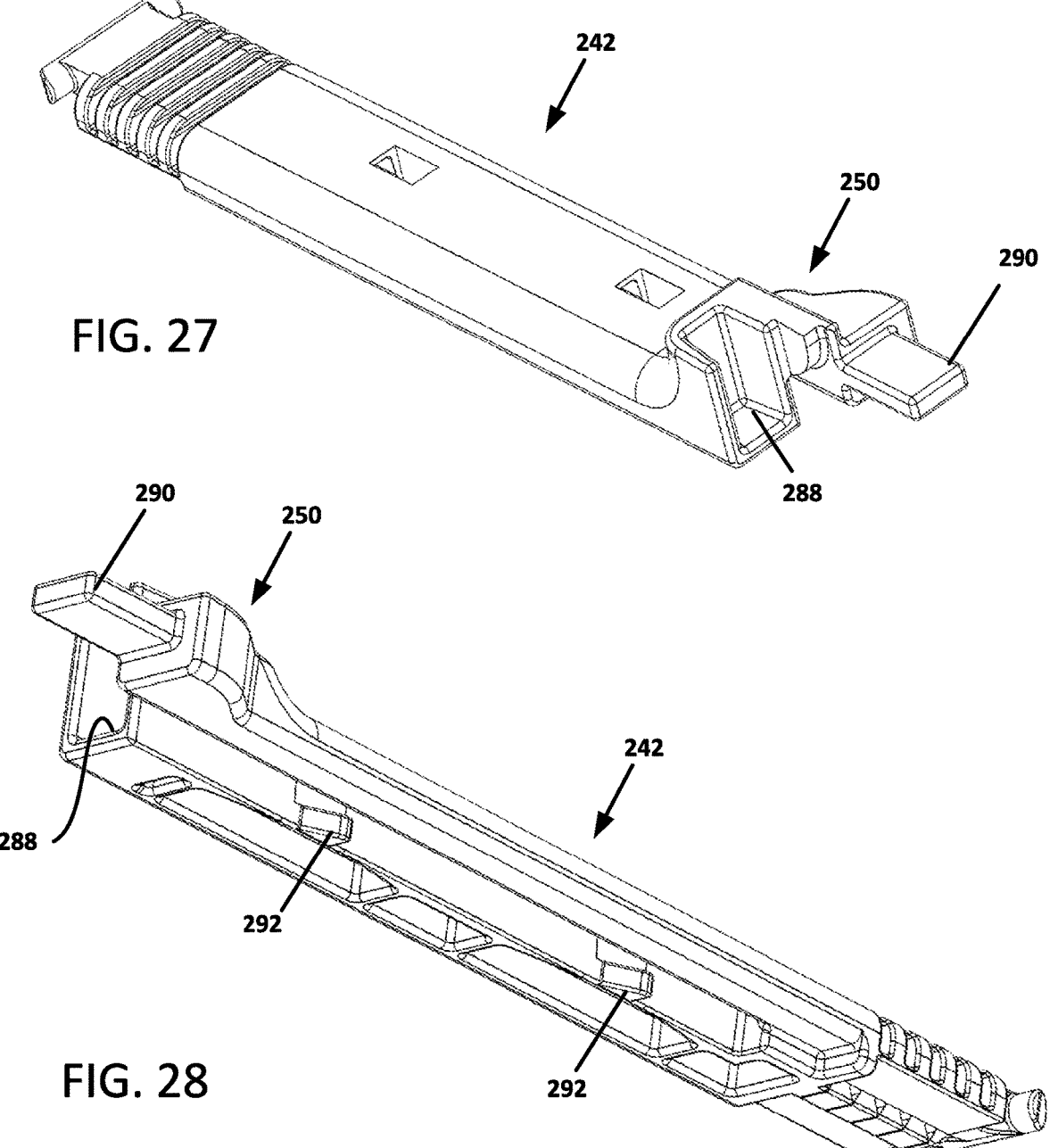
FIG. 27 is a top perspective view of an example hinge part suitable for use with the second hinge arrangement of FIG. 15.
FIG. 28 is a bottom perspective view of the hinge part of FIG. 27.
Figure 29:
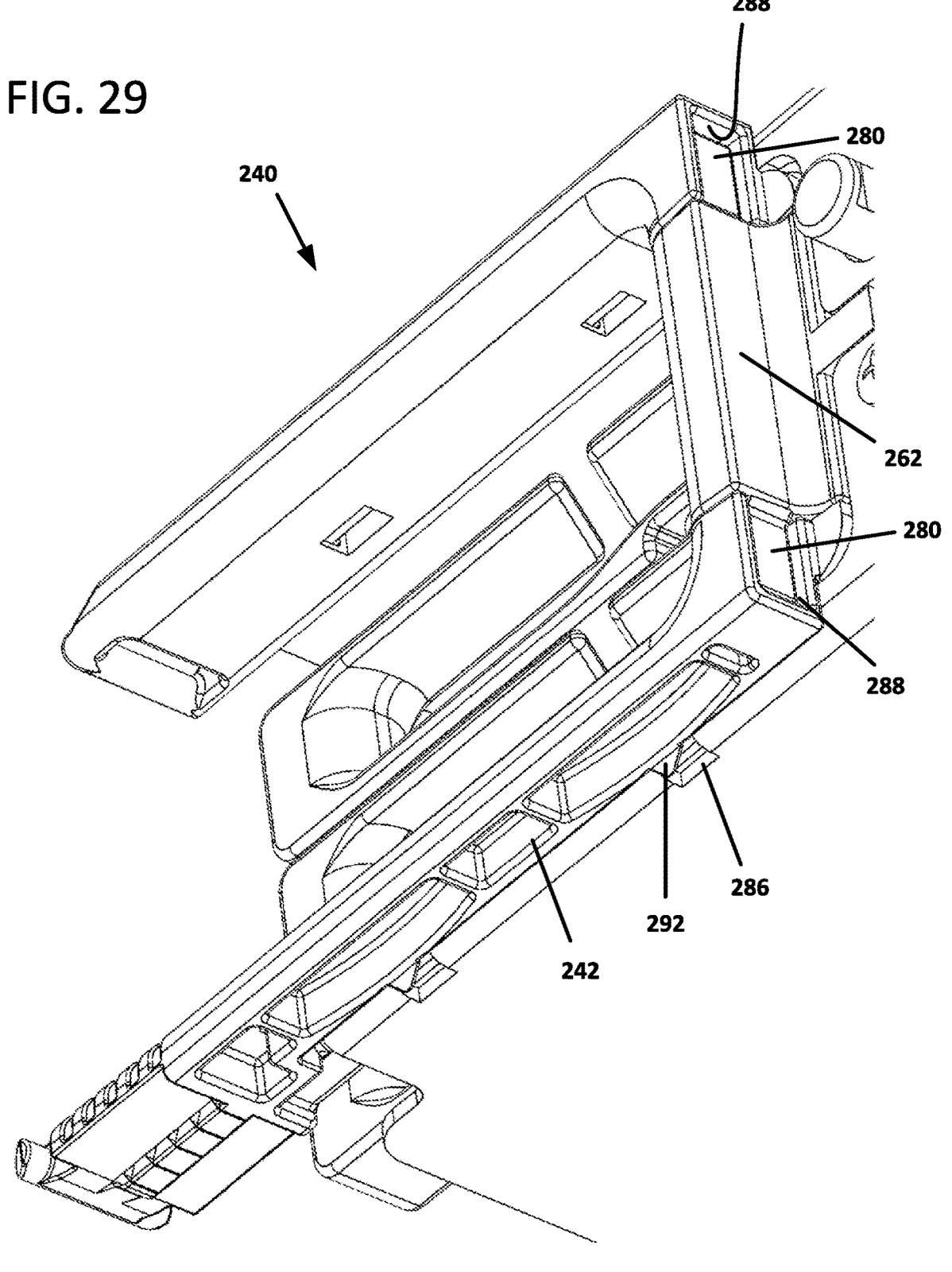
FIG. 29 shows the hinge part of FIGS. 27 and 28 mounted to the chassis of FIG. 16.
Figure 32:
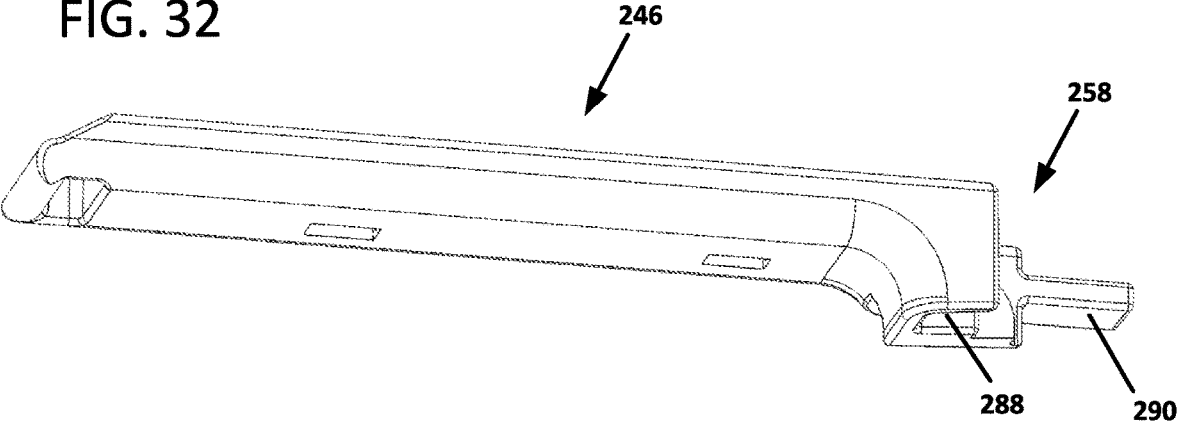
FIG. 32 is a bottom perspective view of an example second retainer part suitable for use with the second hinge arrangement of FIG. 15.
Figure 33:
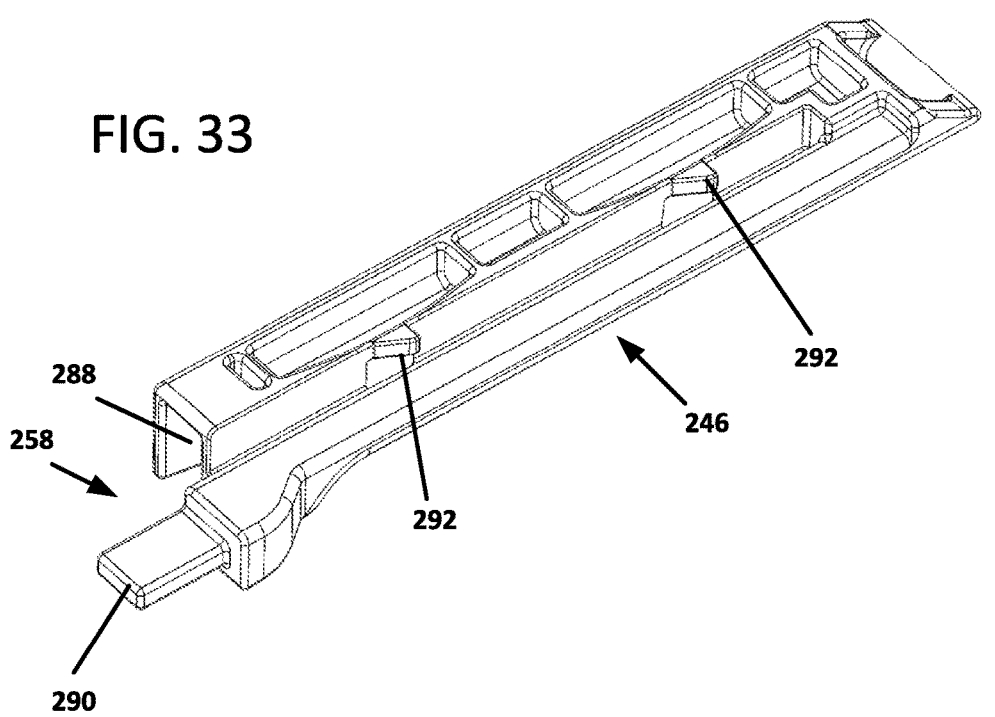
FIG. 33 is a top perspective view of the second retainer part of FIG. 32.
Figure 34:
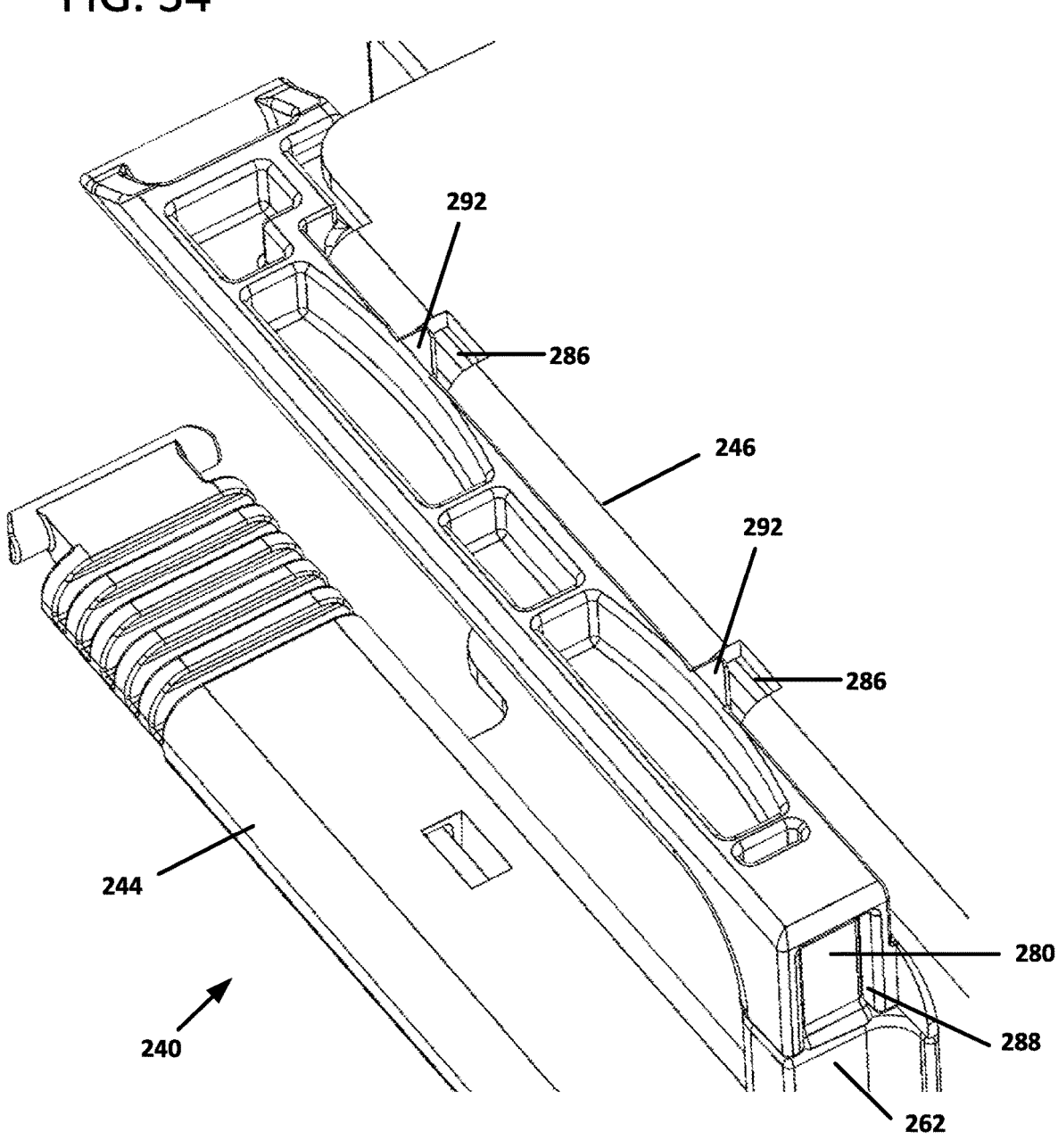
FIG. 34 shows the second retainer part of FIGS. 32-33 mounted to the chassis of FIG. 16.
Figure 35:
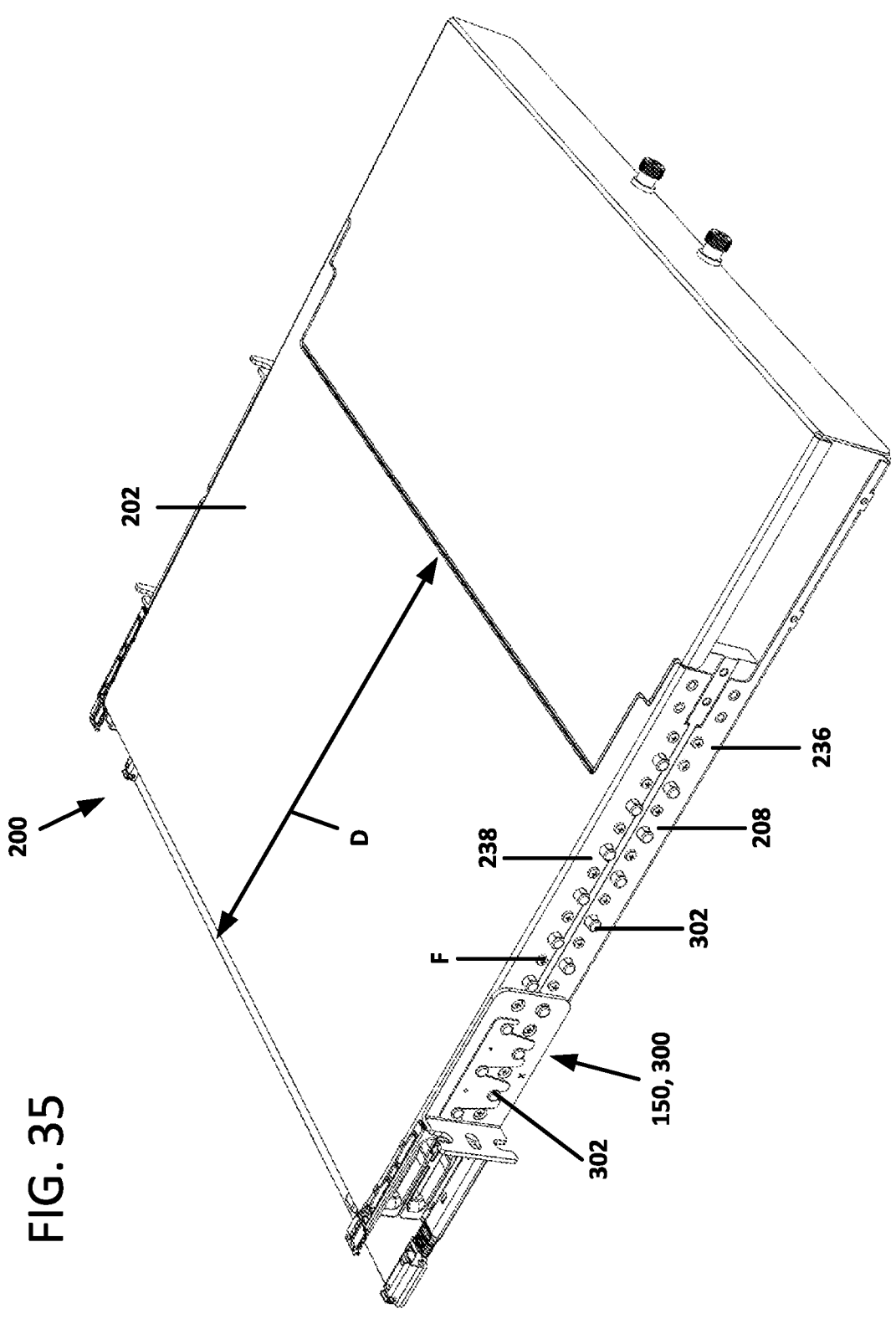
FIG. 35 shows an example mounting bracket arrangement disposed on the chassis of FIG. 15.
Figure 36:
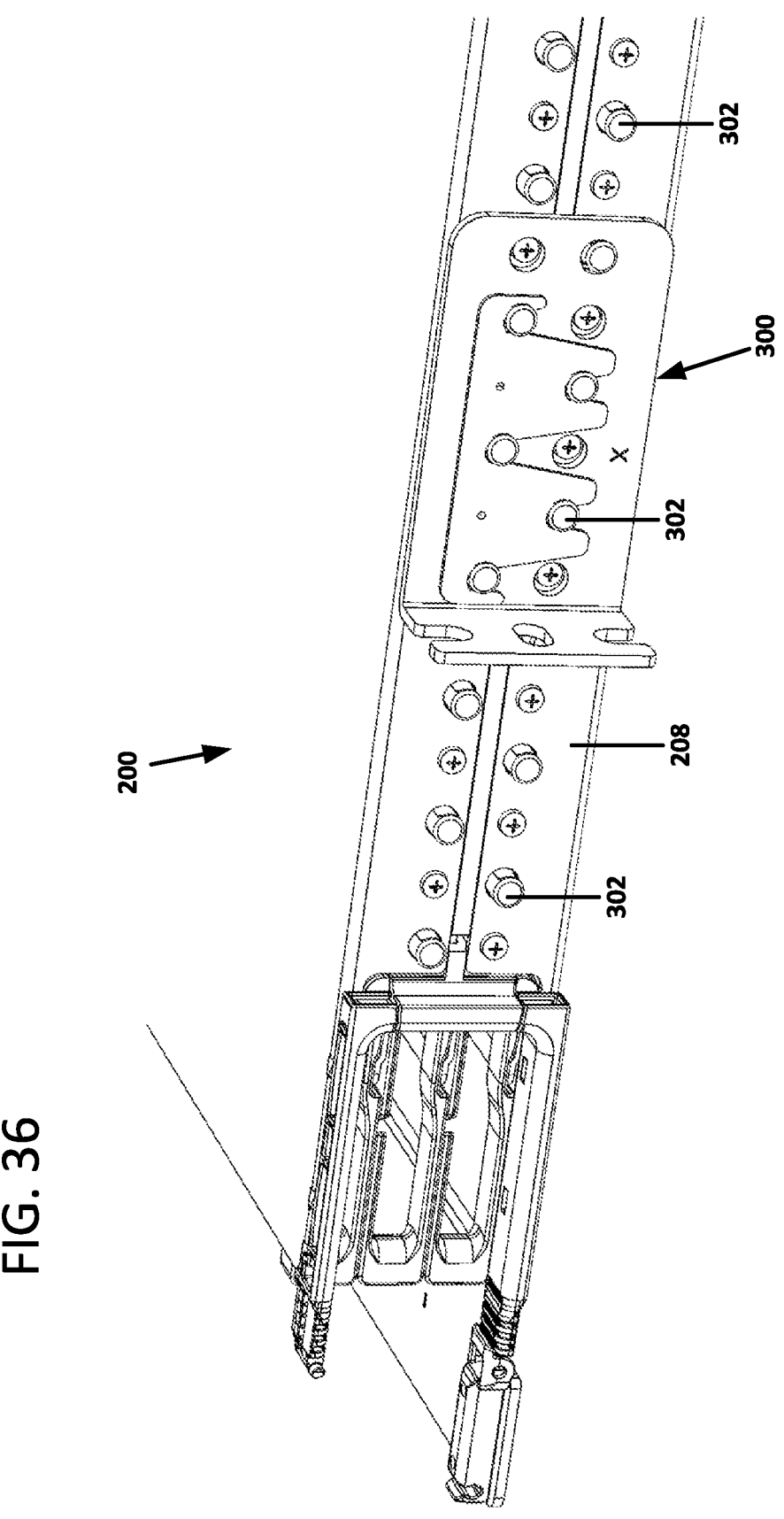
FIG. 36 is an enlarged view of the mounting bracket arrangement of FIG. disposed on the first side of the chassis.

FIGS. 27 and 28 illustrate an example mounting section 250 of a hinge part 242. The example mounting section 250 includes a pocket 288 and a tab 290 at the end of the hinge part 242. In certain examples, the hinge part 242 also includes teeth 292 extend outwardly from a side of the hinge part 242. As shown in FIG. 29, the hinge part 242 is mounted to the bottom piece 230 of the chassis 102 so that the pocket 288 receives one of the support posts 280 of the support mount 262, the tab 290 is received in one of the slots 282 of the side part 234, and the teeth 292 are received in the apertures 286 defined in the overhang flange 284 of the bottom piece 230. As shown in FIGS. 32-34, the mounting section 258 of the second retainer part 246 mounts to the side part 234 and top piece 232 in the same way.

Figures 30, 31:
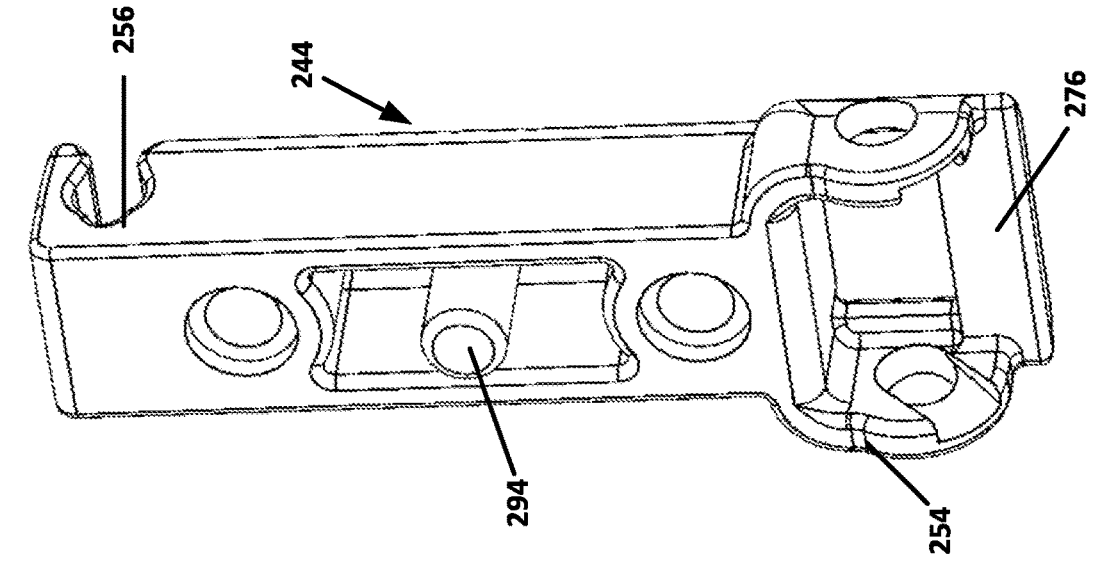
FIG. 30 is a first perspective view of an example first retainer part suitable for use with the second hinge arrangement of FIG. 15.
FIG. 31 is a second perspective view of the first retainer part of FIG. 30.

FIGS. 30 and 31 illustrate an example implementation of a first retainer part 244. In certain implementations, the first retainer part 244 is configured to mount directly to the door 122. In the example shown, the first retainer part 244 includes a post 294 that mates with a hole in the door 122. In some examples, the post friction fits within the hole to hold the first retainer part 244 at the door 122. In other examples, the post is adhesively held within the hole of the door 122. In still other examples, the post is welded (e.g., ultrasonically welded, thermally welded, etc.) to the door 122. In other examples, the first retainer part. 244 defines fastener openings at which fasteners can be inserted to hold the first retainer part 244 to the door 122.

In some implementations, the first retainer part 244 extends along a full height of the door 122, In such implementations the mounting section 254 of the first retainer part 244 attaches to the second mounting section 252 of the hinge part 242 as described above while the connecting part 256 of the first retainer part 244 is positioned to selectively align with the connecting section 260 of the second retainer part 246. In other implementations, the second hinge arrangement 240 includes two first retainer parts 244 disposed at a common side of the door 122. One of the first retainer parts 244 is mounted to the door 122 at a bottom of the door 122 to connect to the hinge part 242; another of the first retainer parts 244 is mounted to the door 122 at a top of the door 122 to selectively connect to the second retainer part 246. Utilizing two first retainer parts 244 enables standardization of part sizes so that the same second hinge arrangement components can be utilized with chassis 102 and doors 122 of various sizes.

Referring now to FIGS. 3-5 and 20-25, in certain implementations, the hinge part 162, 242 is manufactured so that the living hinge 164, 248 is molded or otherwise formed in a curved position so that the second mounting section 168, 252 of the hinge part 162, 242 is not aligned with the first mounting portion 166, 250 when the living hinge 164, 248 is disposed in the neutral positon. Accordingly, the living hinge 164, 248 would bias the second mounting section 168, 252 upwardly towards the second retainer part 176, 246. The weight of the door 122 would counteract the bias to flex the living hinge 164, 248 to move the second mounting portion 168, 252 away from the second retainer part 176, 246. Such a bias may mitigate the effects of material fatigue on the living hinge 164, 248.

Referring now to FIGS. 35-40, a mounting bracket 150 can be mounted to each side 108, 110 of the chassis 102 formed from the bottom, top, and side pieces 230, 232, 234. FIGS. 35-40 illustrate an example bracket arrangement 300 suitable for mounting the chassis panel 200 to a rack. The mounting bracket arrangement 300 includes a mounting bracket 150 and a fixation member 310 configured to toollessly and securely attach the mounting bracket 150 to the chassis 202. In certain implementations, the mounting bracket arrangement 300 and the chassis 202 are configured to enable the mounting bracket 150 to be mounted to the chassis 202 at any of a plurality of predetermined positions along the depth D of the chassis 202 (e.g., see FIGS. 35 and 36). In certain examples, the fixation member 310 is configured to engage protruding features on the chassis 202 to hold the mounting bracket 150 to the chassis 202.

As shown in FIG. 16, the chassis 202 includes side pieces 234 that couple together a top piece 232 and a bottom piece 230. The side pieces 234 each carry one or more guide pegs 302 extending outwardly from the side piece 234. In certain implementations, the guide pegs 302 are arranged in a row along the depth D of the side piece 234. In the example shown, the guide pegs 302 are disposed in two rows along the depth D. In certain examples, the guide pegs 302 alternate with fasteners F along the row(s). The fasteners F hold the bottom and top pieces 230, 232 to the side pieces 234.

The mounting bracket 150 includes a first section 152 configured to extend over one of the sides 208, 210 of the chassis and a second section 156 configured to attach to the rack. The first section 152 defines a plurality of openings 154 and the second section 156 defines a plurality of openings 158. The openings 154 of the first section 152 are arranged to align with at least some of the guide pegs 302 extending outwardly from the chassis sidewall 208, 210. In certain examples, the openings 154 also align with the fasteners F at the sidewall 208, 210. In certain examples, the openings 154 are fully bounded by the first section 152.

In certain implementations, the openings 158 of the second section 156 are open-ended openings 158a (i.e., notches) continuous with an exterior of the second section 156. Open-ended openings 158a enable the second section 156 of the mounting bracket 150 to slide over fasteners pre-mounted to the rack. Alternatively, in certain implementations, the openings 158 of the second section 156 are closed openings 158b (i.e., fully bounded by the second section 156). Closed openings 158b may be aligned with openings defined by the rack to enable insertion of a fastener therethrough.

Figure 37:
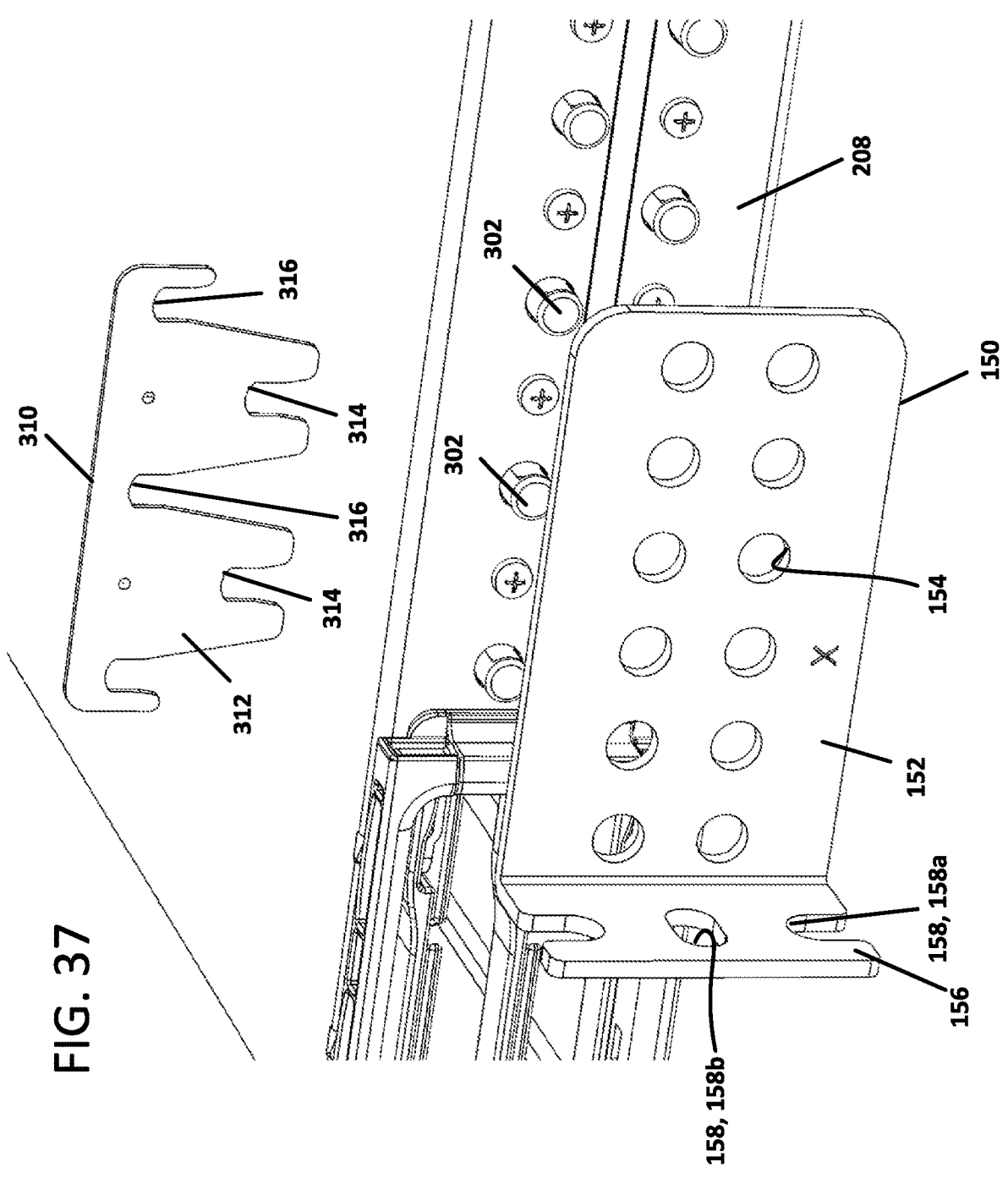
FIG. 37 shows the mounting bracket and a fixation member of the mounting bracket arrangement of FIG. 35 exploded from the chassis for ease in viewing.
Figure 38:
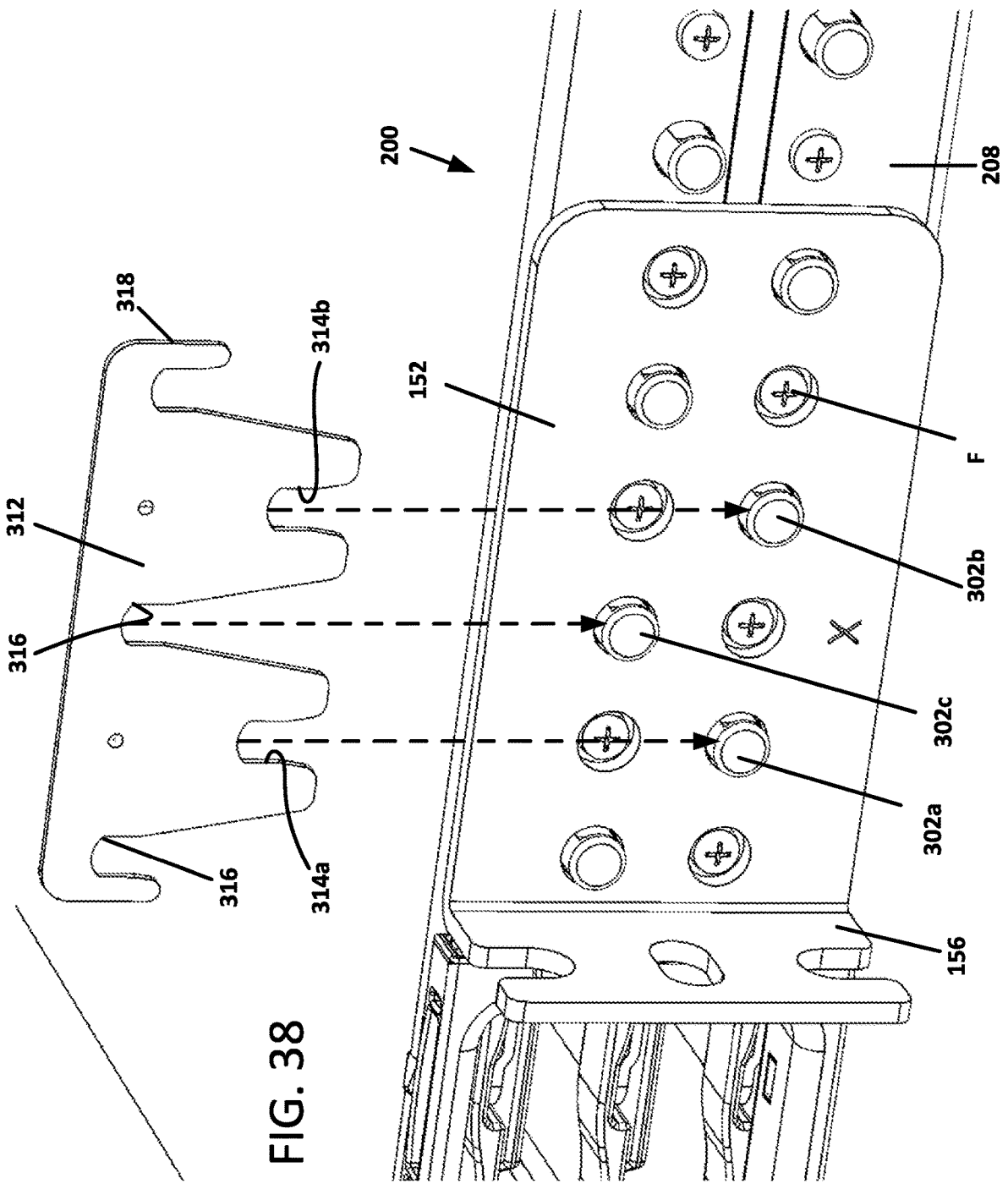
FIG. 38 shows the bracket disposed at the side of the chassis and the fixation member exploded from the bracket, but aligned with the guide pegs.
Figure 39:
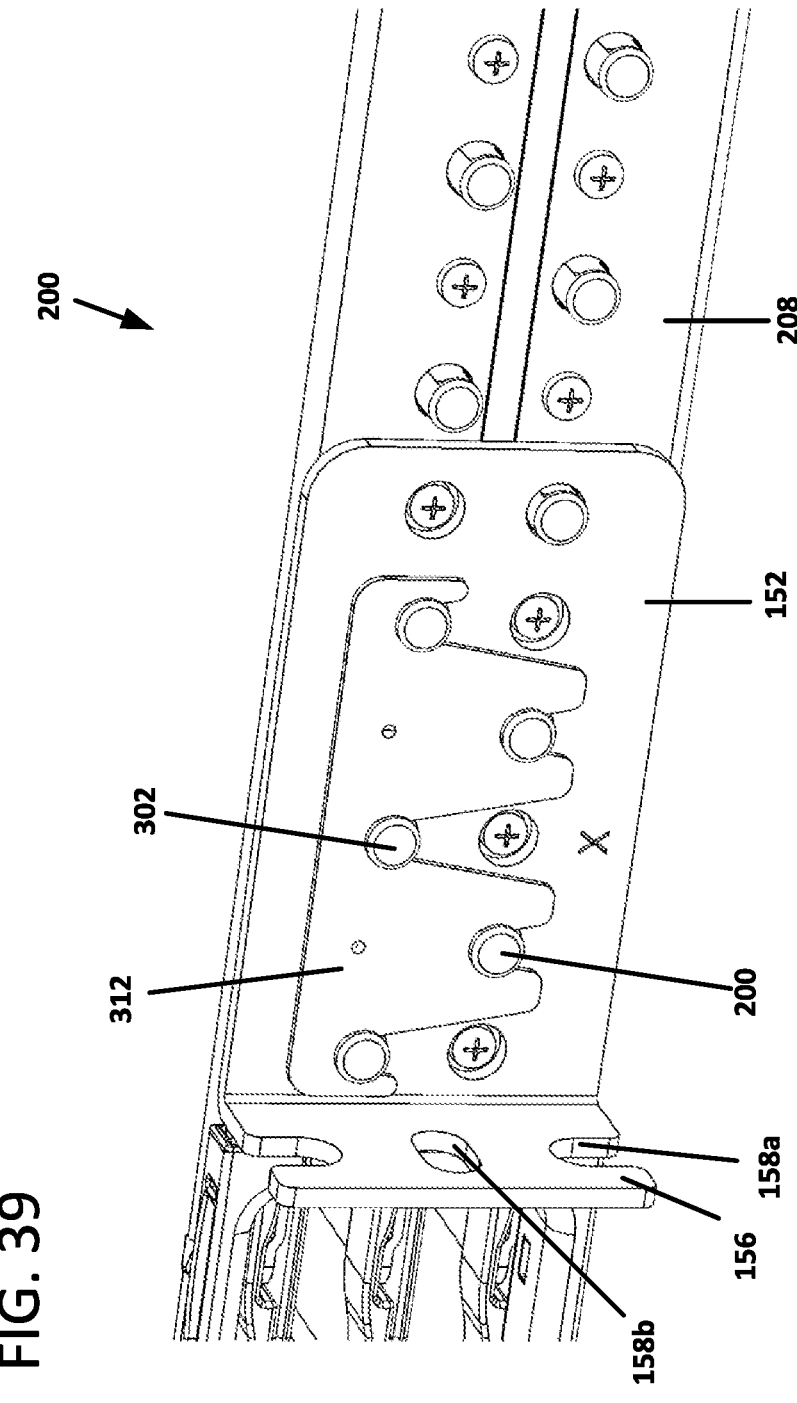
FIG. 39 shows the fixation member of FIG. 38 securing the bracket to the chassis.
Figure 40:
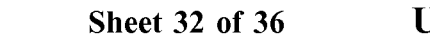
FIG. 40 is a top perspective view of the mounting bracket arrangement of FIG. 39 where recesses in the guide pegs are visible.

In use, a user selects where to mount the bracket 150 to the chassis sidewall 208, 210. As shown in FIG. 37, the first section 152 of the bracket 150 is aligned with one or more guide pegs at the selected location. As shown in FIG. 38, the mounting bracket 150 is pressed against the sidewall 208, 210 so that the guide pegs 302 extend through the openings 154 of the first section 152. Accordingly, the mounting bracket 150 is held fixed along the height H of the chassis 202 by the guide pegs 302. The mounting bracket 150 also is held fixed along the depth D of the chassis 202 by the guide pegs 302. To secure the mounting bracket 150 to the chassis 202 along the width W of the chassis 202, a fixation member 310 is mounted over the bracket 150 so that the first section 152 is sandwiched between the sidewall 208, 210 of the chassis 202 and the fixation member 310.

In certain implementations, the fixation member 310 includes a flat body 312 defining a plurality of open-ended notches 314, 316 sized to receive the guide pegs 302 of the chassis sidewall 208, 210. The notches 314, 316 open at a common side of the fixation body 312. In certain examples, the fixation member 310 defines two rows of notches 314, 316 that all open at the bottom of the body 312. The open ends of the notches 314, 316 enable the fixation member 310 to slide along the first section 152 of the mounting bracket 150 (e.g., along the height U of the chassis 202) so that the guide pegs 302 slide into the notches 314, 316. The notches 314 of the first row receive the guide pegs 302 in a first row along the chassis sidewall 208, 210 and the notches 316 of the second row receive the guide pegs 302 in a second row along the chassis sidewall 208, 210.

In the example shown in FIG. 38, a first notch 314a in a first row of notches receives a guide peg 302a in a first row of pegs, a second notch 314b in the first row of notches receives a second guide peg 302b in the first row of pegs, and a notch 316 in a second row of notches receives a guide peg 302c in a second row of pegs. In certain examples, the notches 314, 316 alternate rows so that the notch 316 is disposed between notches 314a, 314b of the first row. In certain examples, the notches 316 of the second row extend through a majority of the fixation body 312. In other examples, one or more of the notches 316 is defined by fingers 318 extending downwardly from a top of the fixation member 310. In certain examples, the fingers 318 extend over less than a majority of the body 310. In the example shown, the fingers 318 extend over less than half of the body 310.

In some examples, the guide pegs 302 define enlarged heads. In other examples, the guide pegs 302 define cutouts or recesses 304 that form an abutment surface 306 facing back towards the chassis sidewall 208, 210 (e.g., see FIG. 40). When the fixation member 310 mounts over the guide pegs 302, the body 312 of the fixation member slides into the cutouts or recesses 304 so that an exterior surface of the body 312 engages the abutment surface 306 of the guide pegs 302 received at the notches 314, 316. Accordingly, the abutment surface 306 (or enlarged head) of the guide pegs 302 holds the fixation member 310 to the chassis 202.

To remove the bracket 150 (e.g., to modify the mounting depth of the panel system 200 relative to the rack), the fixation member 310 is slid upwardly away from the guide pegs 302. When the fixation member 310 has been removed, the bracket 150 can be pulled away from the chassis sidewall 208, 210 until the openings 154 clear the guide pegs 302.

Having described the preferred aspects and implementations of the present disclosure, modifications and equivalents of the disclosed concepts may readily occur to One skilled in the art. However, it is intended that such modifications and equivalents be included within the scope of the claims which are appended hereto,

What is claimed is:

1. A panel system comprising:
   a chassis defining an interior accessible through an open front, the open front extending along a height of the chassis between a bottom of the chassis and a top of the chassis;
   a door arrangement mounted to the chassis to move between a closed position and an open position, the door arrangement including a door and a latching member attached to the door, the door blocking access to the interior of the chassis from the open front of the chassis when the door arrangement is disposed in the closed position, the door allowing access to the interior of the chassis from the open front of the chassis when the door arrangement is disposed in the open position, the latching member defining a groove facing towards the chassis when the door arrangement is disposed in the closed position; and
   a closure arrangement mounting the door to the chassis, the closure arrangement including:
      a bottom member attached to the chassis at the bottom of the chassis, the bottom member extending forwardly from the open front of the chassis to a second end attached to the door arrangement, the bottom member defining a living hinge between the chassis and the second end; and
      a retention member attached to the chassis at the top of the chassis, the retention member including a retention rod sized to fit within the groove of the latching member of the door arrangement to hold the door arrangement in the closed position.

2. The panel system of claim 1, wherein the second end of the bottom member attaches directly to the door.

3. The panel system of claim 2, wherein the second end snap-fits to the door.

4. The panel system of claim 1, wherein the bottom member snap-fits to the chassis.

5. The panel system of claim 1, wherein the retention member snap-fits to the chassis.

6. The panel system of claim 1, wherein the second end of the bottom member attaches to the latching member.

7. The panel system of claim 6, wherein the second end of the bottom member is rotatably attached to the latching member.

8. The panel system of claim 6, wherein a range of motion is between 91 degrees and 100 degrees.

9. The panel system of claim 6, wherein the living hinge defines a first series of slots facing in a first direction and a second series of slots facing in a second direction that is opposite the first direction, the slots of the first series being spaced further apart from each other compared to the slots of the second series.

10. The panel system of claim 6, wherein the bottom member and the retention member are coupled together to mount to the chassis as a unit.

11. The panel system of claim 1, wherein the door extends between a top and a bottom, and wherein the bottom of the door is disposed forward of the open front of the chassis and the top and bottom of the door are disposed below the bottom of the chassis when the door arrangement is disposed in the open position.

12. A panel system configured to mount to a rack, the panel system comprising:

a chassis extending laterally between first and second sidewalls, the chassis also extending along a forward-rearward axis between a front and a rear of the chassis, the first sidewall defining a bracket mounting region in which a plurality of outwardly extending pegs are disposed, the bracket mounting region extending a first distance along the forward-rearward axis, each of the outwardly extending pegs defining a head that is larger than a neck of the outwardly extending peg;

a bracket configured to secure to the rack, the bracket being separate from the chassis, the bracket defining a first mounting region configured to extend along the bracket mounting region of the first sidewall of the chassis, the first mounting region defining a hole sized to receive one of the outwardly extending pegs when the bracket is disposed at the bracket mounting region of the first sidewall, the pegs of the chassis and the hole of the bracket enabling the bracket to be disposed at a selected one of a plurality of positions along the first sidewall along the forward-rearward axis; and a fixation member separate from the chassis and separate from the bracket, the fixation member being position-able between the first mounting region of the bracket and the head of the peg received in the hole of the bracket to retain the bracket at the chassis.

13. The panel system of claim 12, wherein the bracket defines a second mounting region that extends in a different direction to the first mounting region.

14. The panel system of claim 13, wherein the second mounting region extends orthogonal to the first mounting region.

15. The panel system of claim 13, wherein the second mounting region is configured to secure to the rack.

16. The panel system of claim 12, wherein the fixation member defines a slot in which the peg received in the hole can be slidably received.

17. The panel system of claim 12, wherein the hole defined in the bracket is one of a plurality of holes, wherein the holes are arranged and configured to align with and receive multiple ones of the outwardly extending pegs for each of the positions along the first sidewall.

18. The panel system of claim 17, wherein the bracket defines a plurality of slots, the slots being configured and arranged to align with the pegs received in the holes of the bracket.

19. The panel system of claim 12, wherein the bracket mounting region of the chassis is a first bracket mounting region, the bracket is a first bracket, and the fixation member is a first fixation member; and wherein the panel system further comprises:

a second plurality of pegs extending outwardly from a second bracket mounting region disposed at the second sidewall of the chassis, each of the pegs of the second plurality having a head that is larger than a neck;

a second bracket configured to mount to the rack, the second bracket defining a first mounting region at which a hole is defined, the hole being sized to receive one of the outwardly extending pegs of the second plurality when the second bracket is disposed at the second bracket mounting region of the second sidewall; and a second fixation member separate from the chassis and separate from the second bracket, the second fixation member being positionable between the first mounting region of the second bracket and the head of the peg received in the hole of the second bracket to retain the second bracket at the chassis.

20. The panel system of claim 12, wherein the outwardly extending pegs are disposed in a first row and a second row that each extend along the forward-rearward axis, the pegs of the first row being offset from the pegs in the second row along the forward-rearward axis.

* * * * *